United States Patent
Katayama et al.

(10) Patent No.: US 12,515,643 B2
(45) Date of Patent: Jan. 6, 2026

(54) DRIVER ASSISTANCE SYSTEM

(71) Applicant: HONDA MOTOR CO., LTD., Tokyo (JP)

(72) Inventors: Makoto Katayama, Saitama (JP); Hiroki Tanaka, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 194 days.

(21) Appl. No.: 18/189,225

(22) Filed: Mar. 24, 2023

(65) Prior Publication Data
US 2023/0322214 A1    Oct. 12, 2023

(30) Foreign Application Priority Data
Mar. 31, 2022    (JP) ................. 2022-061392

(51) Int. Cl.
*B60W 30/09*    (2012.01)
*B60W 30/095*    (2012.01)

(52) U.S. Cl.
CPC ........ *B60W 30/09* (2013.01); *B60W 30/0953* (2013.01); *B60W 30/0956* (2013.01); *B60W 2300/36* (2013.01); *B60W 2554/4029* (2020.02); *B60W 2554/80* (2020.02)

(58) Field of Classification Search
CPC ............. B60W 30/09; B60W 30/0953; B60W 30/0956; B60W 2300/36; B60W 2554/4029; B60W 2554/80; B60W 2756/10; B60W 10/184; B60W 10/20; B60W 2554/4041; B60W 2554/804; B60W 2554/803
See application file for complete search history.

(56) References Cited

U.S. PATENT DOCUMENTS

| | | | | |
|---|---|---|---|---|
| 2015/0206001 A1* | 7/2015 | Maurer | ................... | G06F 18/24 |
| | | | | 382/103 |
| 2018/0118202 A1* | 5/2018 | Shimizu | ................... | B60T 7/12 |
| 2019/0098953 A1* | 4/2019 | Strickland | ............. | G06V 20/58 |
| 2019/0276013 A1* | 9/2019 | Kim | ..................... | B60W 30/085 |
| 2020/0339144 A1* | 10/2020 | Oshida | ..................... | B62J 27/00 |
| 2020/0377098 A1* | 12/2020 | Klink | .................... | B60W 10/30 |
| 2021/0009061 A1* | 1/2021 | Roh | ....................... | G01S 17/931 |

FOREIGN PATENT DOCUMENTS

JP    2021002328 A    1/2021

* cited by examiner

*Primary Examiner* — Dylan M Katz
(74) *Attorney, Agent, or Firm* — CKC & PARTNERS CO., LLC

(57) ABSTRACT

A driver assistance system is provided with: an external sensor unit that acquires forward information; and a driver assistance control device that calculates, on the basis of the forward information, a relative speed and a predicted time to collision between the vehicle body and an object, and additionally executes a braking control for emergency avoidance that operates a brake device automatically at a timing determined on the basis of the predicted time to collision. If the object is a pedestrian, the driver assistance control device executes the braking control when the current state point specified by the relative speed and the predicted time to collision is inside an area 1 above a braking avoidance limit line L4, and executes a steering control that automatically changes the travel direction of the vehicle body when the state point is inside an area 2 at or below the limit line L4.

9 Claims, 15 Drawing Sheets

DRIVER ASSISTANCE SYSTEM

This application is based on and claims the benefit of priority from Japanese Patent Application No. 2022-061392, filed on 31 Mar. 2022, the content of which is incorporated herein by reference.

BACKGROUND OF THE INVENTION

Field of the Invention

The present invention relates to a driver assistance system. More specifically, the present invention relates to a driver assistance system for a motorcycle provided with a function for operating a brake device automatically on the basis of forward information and a predicted time to collision.

Related Art

Recently, to improve traffic safety, many four-wheeled passenger vehicles are equipped with collision damage reduction braking devices (hereinafter also referred to as "AEB devices"). An AEB device operates a brake device automatically to avoid a collision between the vehicle and an obstacle, or to lower the collision speed. An AEB device can be used to reduce collision damage by lowering the collision speed for motorcycles as well, and therefore in recent years, research into installing an AEB device in a motorcycle is progressing (for example, see Japanese Unexamined Patent Application, Publication No. 2021-2328).
Patent Document 1: Japanese Unexamined Patent Application, Publication No. 2021-2328

SUMMARY OF THE INVENTION

In this way, according to an AEB device of the related art, the collision speed can be lowered before making contact with an object, and thus even if, for example, the vehicle cannot be stopped before the predicted collision point where contact with an object is predicted due to delayed recognition of the target, damage to both the vehicle and the target can be reduced. However, in the case in which the object is a pedestrian, contact is preferably avoided as much as possible.

An objective of the present invention is to provide a driver assistance system for a motorcycle that is able to avoid contact between the motorcycle and a pedestrian as much as possible.

(1) A driver assistance system according to the present invention is provided with: a forward information acquirer that acquires forward information about a state ahead of a vehicle body of a vehicle which is a motorcycle; a predictor that calculates, on a basis of the forward information, a relative speed and a predicted time to collision between the vehicle body and an object ahead of the vehicle body; and a driver assistance controller that executes an automated braking control that operates a brake device automatically at a timing determined on a basis of the predicted time to collision, wherein if the object is a pedestrian, the driver assistance controller executes the automated braking control when the relative speed is less than a speed threshold determined on a basis of the predicted time to collision, and executes a travel direction change control that automatically changes a travel direction of the vehicle body when the relative speed is equal to or greater than the speed threshold.

(2) In this case, the driver assistance controller preferably sets the speed threshold to a smaller value as the predicted time to collision is shorter.

(3) In this case, if the relative speed is equal to or greater than the speed threshold and an avoidance space at least free of an obstacle exists in a vicinity of the object, the driver assistance controller preferably executes the travel direction change control and changes the travel direction of the vehicle body to the avoidance space, and if the relative speed is equal to or greater than the speed threshold and the avoidance space does not exist, the driver assistance controller preferably executes the automated braking control.

(4) In this case, the driver assistance controller preferably determines whether or not the avoidance space exists within a lane in which the vehicle is traveling or on a road other than a sidewalk.

(5) In this case, if the object is a crossing pedestrian who is crossing a road, the driver assistance controller preferably determines whether or not the avoidance space exists with priority given to a rearward side of a movement direction of the object over a forward side of the movement direction of the object.

(6) In this case, the predictor preferably calculates the relative speed and the predicted time to collision after the startup time of the automated braking control from the point in time when the predicted time to collision is determined to be less than or equal to a predetermined first time threshold as the relative speed estimate and the predicted time to collision estimate, respectively, and the driver assistance controller preferably executes the automated braking control when the relative speed estimate is less than the speed threshold determined on the basis of the predicted time to collision estimate, and preferably executes the travel direction change control when the relative speed estimate is equal to or greater than the speed threshold.

(7) In this case, if the predicted time to collision is less than or equal to a second time threshold set to a larger value than the first time threshold, the driver assistance controller preferably executes warning braking that vibrates the vehicle body by automatically operating the brake device to generate braking force intermittently.

(8) In this case, the driver assistance controller, after avoiding contact with the object by executing the travel direction change control, preferably executes a post-avoidance assistance process that decelerates the vehicle body in an upright state by operating the brake and a steering device automatically.

(9) A driver assistance system according to the present invention is provided with: a forward information acquirer that acquires forward information about a state ahead of a vehicle body of a vehicle which is a motorcycle; a predictor that calculates, on a basis of the forward information, a relative speed and a predicted time to collision between the vehicle body and an object ahead of the vehicle body; and a driver assistance controller that executes an automated braking control that operates a brake device automatically at a timing determined on a basis of the predicted time to collision, wherein if the object is a pedestrian, the driver assistance controller executes the automated braking control when the predicted time to collision is greater than a time threshold determined on a basis of the relative speed, and executes a travel direction change control that automatically changes a travel direction of the vehicle body when the predicted time to collision is less than or equal to the predicted time to collision.

(10) In this case, the driver assistance controller preferably sets the time threshold to a smaller value as the relative speed is lower.

(1) In the driver assistance system according to the present invention, the driver assistance controller executes the automated braking control that operates the brake device automatically at a timing determined on the basis of the predicted time to collision calculated by the predictor. If the object is a pedestrian, the driver assistance controller executes the automated braking control when the relative speed calculated by the predictor is less than a speed threshold determined on the basis of the predicted time to collision, and executes the travel direction change control that automatically changes the travel direction of the vehicle body when the relative speed is equal to or greater than the speed threshold. Thus, according to the present invention, in the case in which the relative speed is less than the speed threshold and contact with the object is avoidable through the automated braking control, the automated braking control with a low vehicle tip-over risk can be executed to avoid contact between the vehicle and the object while also preventing damage due to tip over of the vehicle. Also, in the case in which the relative speed is equal to or greater than the speed threshold and contact with the object is unavoidable through the automated braking control, the travel direction change control can be executed to avoid contact between the vehicle and the object. Thus, according to the present invention, by switching between the automated braking control and the travel direction change control depending on the relative speed and predicted time to collision with respect to the object, contact between the vehicle and the object which is a pedestrian can be avoided as much as possible, thereby improving traffic safety.

(2) By setting the speed threshold to a smaller value as the predicted time to collision is shorter, the driver assistance controller can appropriately separate cases in which contact is avoidable through the automated braking control from cases in which contact is avoidable through the travel direction change control, and thus contact between the vehicle and the object which is a pedestrian can be avoided as much as possible.

(3) If the relative speed is equal to or greater than the speed threshold and an avoidance space at least free of an obstacle exists in the vicinity of the object, the driver assistance controller changes the travel direction of the vehicle body to the avoidance space by executing the travel direction change control, and if the relative speed is equal to or greater than the speed threshold and an avoidance space does not exist, the driver assistance controller executes the automated braking control. This arrangement makes it possible to prevent the vehicle body from making contact with an obstacle after the travel direction of the vehicle body is changed to avoid contact with the object, thereby improving traffic safety.

(4) The driver assistance controller determines whether or not an avoidance space exists within the lane in which the vehicle is traveling or on the road other than the sidewalk. This arrangement makes it possible to prevent the vehicle body from making contact with another moving body traveling in a travel lane adjacent to the vehicle body or from driving up onto a sidewalk after the travel direction of the vehicle body is changed to avoid contact with the object, thereby improving traffic safety.

(5) If the object is a crossing pedestrian who is crossing the road, the driver assistance controller determines whether or not an avoidance space exists with priority given to the rearward side of the movement direction of the object over the forward side of the movement direction of the object. With this arrangement, contact between the vehicle and the object can be avoided more reliably, thereby improving traffic safety.

(6) The predictor calculates the relative speed and the predicted time to collision after the startup time of the automated braking control from the point in time when the predicted time to collision is determined to be less than or equal to the first time threshold as the relative speed estimate and the predicted time to collision estimate, respectively, and the driver assistance controller executes the automated braking control when the relative speed estimate is less than the speed threshold determined on the basis of the predicted time to collision estimate, and executes the travel direction change control when the relative speed estimate is equal to or greater than the speed threshold. Thus, according to the present invention, at the point in time when the predicted time to collision has become less than or equal to the first time threshold, the determination of whether the automated braking control or the travel direction change control should be executed can be made appropriately with consideration for the time required to start up the automated braking control, thereby avoiding contact between the vehicle and the object as much as possible, and by extension, improving traffic safety further.

(7) The driver assistance controller executes warning braking that vibrates the vehicle body, and by extension the part of the rider's body touching the vehicle body, by automatically operating the brake device to generate braking force intermittently when the predicted time to collision is less than or equal to a second time threshold set to a larger value than the first time threshold, or in other words, before the automated braking control or the travel direction change control is executed, and thus a rider who is not looking at the display or a rider who is wearing a full face helmet and cannot easily hear a warning sound, for example, can reliably be made aware of the existence of an object before the automated braking control or the travel direction change control is initiated, thereby avoiding contact between the vehicle and the object as much as possible, and by extension, improving traffic safety further.

(8) The driver assistance controller, after avoiding contact with the object by executing the travel direction change control, executes a post-avoidance assistance process that decelerates the vehicle body in an upright state by operating the brake device and the steering device automatically. This arrangement makes it possible to avoid both contact between the vehicle and the object and the tip over of the vehicle, thereby improving traffic safety further.

(9) A driver assistance system according to the present invention exhibits advantageous effects similar to the invention as in (1) above.

(10) A driver assistance system according to the present invention exhibits advantageous effects similar to the invention as in (2) above.

DETAILED DESCRIPTION OF THE INVENTION

Hereinafter, a configuration of a driver assistance system according to an embodiment of the present invention will be described with reference to the drawings.

Figure 1:
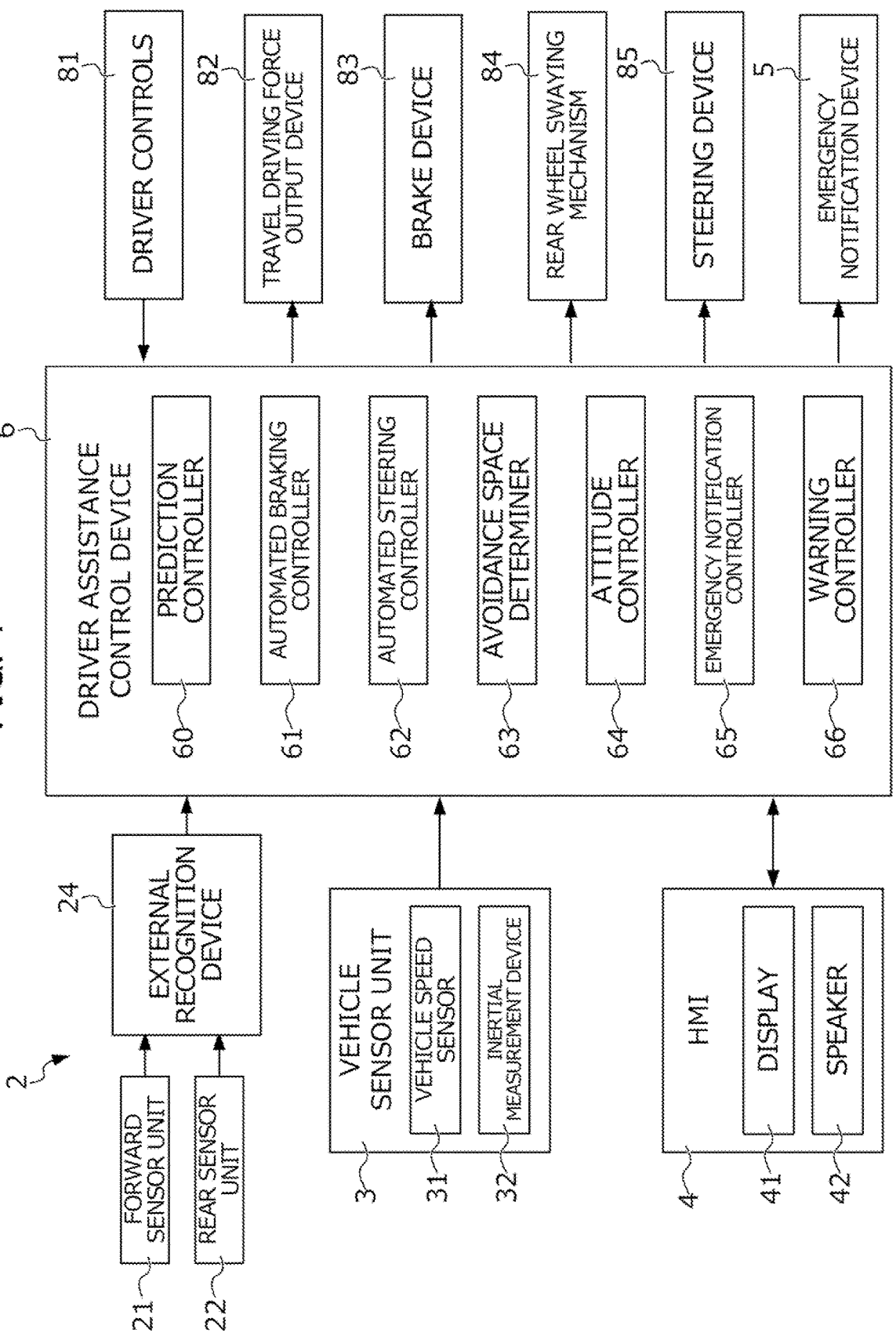
FIG. 1 is a diagram that schematically illustrates a configuration of a driver assistance system according to an embodiment of the present invention.

FIG. 1 is a diagram illustrating a configuration of a driver assistance system 1 according to the present embodiment. The driver assistance system 1 is installed in a motorcycle not illustrated. Note that the drive source of the motorcycle may be an internal combustion engine, a rotary electric motor, or a combination of the two. Also, the power source of the rotary electric motor may be a secondary battery, a capacitor, or a fuel cell.

The driver assistance system 1 assists with safe driving of a motorcycle by the driver. Among the various driver assistance functions achieved by the driver assistance system 1, the following describes an emergency braking function that automatically operates a brake device to avoid a collision between the vehicle body of the driver's own vehicle (hereinafter simply referred to as the "vehicle body") and an object or to lessen collision damage.

The driver assistance system 1 is provided with an external sensor unit 2, a vehicle sensor unit 3, a human-machine interface (HMI) 4 (hereinafter, the abbreviation "HMI 4" will be used), an emergency notification device 5, a driver assistance control device 6, driver controls 81, a travel driving force output device 82, a brake device 83, and a rear wheel swaying mechanism 84. These devices are interconnected by multiple communication lines such as controller area network (CAN) communication lines, serial communication lines, or a wireless communication network.

The external sensor unit 2 includes a forward sensor unit 21, a rear sensor unit 22, an external recognition device 24, and the like.

The forward sensor unit 21 is formed from a digital camera using a solid-state image sensor such as a charge-coupled device (CCD) sensor or a complementary metal-oxide semiconductor (CMOS) sensor, a millimeter-wave radar that detects an object by emitting a millimeter wave and measuring the reflected wave thereof returning from the object, and the like. Note that the digital camera and millimeter-wave radar forming the forward sensor unit 21 are each mounted to any location on the front part of the vehicle body, such as the front windshield or a mirror, for example, and face the direction ahead of the vehicle.

The rear sensor unit 22 is formed from a digital camera, a millimeter-wave radar, and the like provided on a rear part of the vehicle body. Note that the digital camera and millimeter-wave radar forming the rear sensor unit 22 are provided at any location on the left and right sides of the rear part of the vehicle body, such as near the left and right direction indicators or near the tail lamp, for example, and face the left and right sides behind the vehicle.

The external recognition device 24 is a computer that applies sensor fusion processing to detection results from some or all of the forward sensor unit 21 and the rear sensor unit 22, and thereby obtains information pertaining to the state ahead of the vehicle body, and more specifically, information about the road and the positions, shapes, types, and speeds of objects as well as the content of road signs and the like existing ahead of the vehicle (hereinafter collectively referred to as "forward information"), information pertaining to the state behind the vehicle body (including directly behind, behind to the left, and behind to the right of the vehicle body), and more specifically, information about the road and the positions, shapes, types, and speeds of objects and the like existing behind the vehicle body (hereinafter collectively referred to as "rearward information"), and the like. The external recognition device 24 transmits the acquired forward information and rearward information to the driver assistance control device 6, for example.

The vehicle sensor unit 3 is provided with a vehicle speed sensor 31 that detects the vehicle speed, a 5-axis or 6-axis inertial measurement device 32, and the like. The inertial measurement device 32 detects the angle or angular velocity and the acceleration of the vehicle body on three axes (roll axis, pitch axis, and yaw axis). A detection signal from the vehicle sensor unit 3 is transmitted to the driver assistance control device 6, for example.

The HMI 4 includes a plurality of interfaces that present various information to an occupant of the vehicle and receive input operations performed by the occupant. FIG. 1 illustrates in particular only the components among the plurality of interfaces included in the HMI 4 that are related to the emergency braking function, namely a display 41 and a speaker 42.

The display 41 is provided at a position visible to the rider while driving, and displays an image or a message according to a command from a warning controller 66 described later of the driver assistance control device 6. The speaker 42 emits a warning sound or an audio message according to a command from the warning controller 66.

The emergency notification device 5 sends an emergency notification by wireless communication to an emergency notification center, not illustrated, on the basis of a command from an emergency notification controller 65, described later, of the driver assistance control device 6.

The driver controls 81 are provided with, for instance, an accelerator grip and a brake lever that the rider operates when accelerating and decelerating, a clutch lever and a shift pedal that the rider operates when shifting gears, a steering handle that the rider operates when steering, and a plurality of operator sensors that detect whether or not the above controls are being operated as well as the control inputs of the above. Detection signals from the operator sensors are transmitted to the driver assistance control device 6.

The travel driving force output device 82 outputs, to the drive wheel, a travel driving force causing the vehicle to travel. The travel driving force output device 82 is provided with, for instance, a driving power source such as an internal combustion engine or a rotary electric motor, a transmission, and an electronic control unit that controls the driving power source and the transmission on the basis of a command signal transmitted from the driver assistance control device 6 and generates an acceleration/deceleration according to the command.

The brake device 83 is provided with, for example, brake calipers, a cylinder that transmits oil pressure to the brake calipers according to the control input of the brake lever or the brake pedal, an electric motor that generates oil pressure in the cylinder, and an electronic control unit that controls the electric motor on the basis of a command signal transmitted from the driver assistance control device 6 and causes braking force to be generated according to the command.

The rear wheel swaying mechanism 84 changes the location of the vehicle body center of gravity in the vehicle width direction by oscillating the direction of the rotation axis of the rear wheel relative to the vehicle body on the basis of a command signal transmitted from an attitude controller 64, described later, of the driver assistance control device 6. Note that a detailed configuration of the rear wheel swaying mechanism 84 is described in Japanese Unexamined Patent Application, Publication No. 2021-175638 and No. 2021-175639 submitted by the present applicant, and as such, a detailed description is omitted.

A steering device 85 changes the direction of the front wheel according to the operation of the steering handle by the driver. The steering device 85 is also provided with an actuator that changes the direction of the front wheel according to input from an automated steering controller 62 described later.

The driver assistance control device 6 is a computer responsible for control related to the driver assistance functions. The driver assistance control device 6 is provided with a prediction controller 60, an automated braking controller 61, an automated steering controller 62, an avoidance space determiner 63, an attitude controller 64, an emergency notification controller 65, and a warning controller 66 as modules for achieving an emergency braking function among a plurality of driver assistance functions.

The prediction controller 60 specifies a moving body, an obstacle, or the like ahead of the vehicle and with the possibility of coming into contact with the vehicle body in the near future as an object on the basis of forward information acquired by the external sensor unit 2, calculates parameters such as the predicted path of the vehicle, the location, travel direction and movement speed of the object, and the relative speed between the object and the vehicle, and calculates, on the basis of the parameters, a predicted collision point which is the point where the object and the vehicle body are predicted to collide and a predicted time to collision which is the time until the object and the vehicle body are predicted to collide.

If a predetermined condition is met, the automated braking controller 61 executes an automated braking control that operates the brake device 83 automatically to decelerate the vehicle body. In particular, if a current state point specified by the relative speed and predicted time to collision calculated by the prediction controller 60 is inside an area at or below a collision possibility determination line L3 described later (see FIG. 16 described later), the automated braking controller 61 executes the automated braking control that operates the brake device 83 automatically such that the vehicle body stops before the predicted collision point, and contact between the object and the vehicle body is avoided. Note that in the following, the automated braking control executed in response to the determination that the state point is inside the area at or below the collision possibility determination line L3 is also referred to in particular as the braking control for emergency avoidance.

If a predetermined condition is met, the automated steering controller 62 executes an automated steering control that operates the steering device 85 automatically to change the direction of the front wheel and thereby change the travel direction of the vehicle body automatically or upright the vehicle body. In particular, similarly to the automated braking controller 61, if the current state point specified by the relative speed and predicted time to collision is inside the area at or below the collision possibility determination line L3, the automated steering controller 62 executes the automated steering control that operates the steering device 85 automatically to change the travel direction of the vehicle body toward an avoidance space determined by the avoidance space determiner 63 described later. Note that in the following, the automated steering control for changing the travel direction of the vehicle body to the avoidance space determined by the avoidance space determiner 63 in this way is also referred to in particular as the steering control for emergency avoidance. Note that the automated steering control by the automated steering controller 62 may also be executed in combination with an automated attitude control described later so that the travel direction of the vehicle body is changed automatically to keep the vehicle body from tipping over.

The avoidance space determiner 63 determines an avoidance space for setting the travel direction of the vehicle body of the vehicle when executing the steering control for emergency avoidance with respect to a pedestrian as the object. If the current state point specified by the relative speed and predicted time to collision calculated with respect to a pedestrian as the object is determined to be inside the area at or below the collision possibility determination line L3, the avoidance space determiner 63 extracts, on the basis of forward information acquired by the external sensor unit 2, areas in the vicinity of the object and at least free of an obstacle that would obstruct the travel of the vehicle as possible avoidance areas, and determines the most suitable area for avoiding contact with the object from among the extracted plurality of possible avoidance areas as the avoidance space.

An example of a procedure for determining the avoidance space by the avoidance space determiner 63 will be described with reference to FIGS. 2 and 3.

Figure 2:
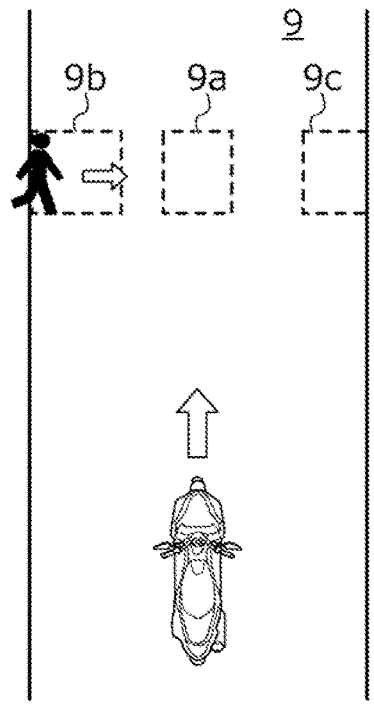
FIG. 2 is a diagram for describing a procedure for determining an avoidance space by an avoidance space determiner.
Figure 3:
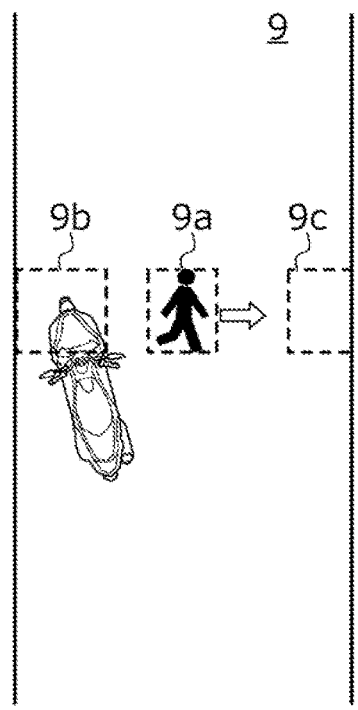
FIG. 3 is a diagram for describing a procedure for determining an avoidance space by an avoidance space determiner.

FIG. 2 is a plan view of a road 9 at the point in time when it is determined that the state point (relative speed and predicted time to collision), which is calculated with respect to a crossing pedestrian as the object who is attempting to cross from the left side to the right side of the road 9 from the point of view of the motorcycle, is determined to be in the area at or below the collision possibility determination line L3. Note that in FIG. 2, dashed lines are used to indicate a predicted collision point 9a, that is, the point where the crossing pedestrian is predicted to be after the predicted time to collision elapses from the point in time illustrated in FIG. 2. FIG. 3 is a plan view of the road 9 when the predicted time to collision has elapsed from the point in time illustrated in FIG. 2.

First, the avoidance space determiner 63 extracts, as a possible avoidance area, an area from within the lane in which the vehicle is traveling or on the road other than the sidewalk, which excludes the predicted collision point 9a and a point where an obstacle that would obstruct the travel of the vehicle exists, and which is bigger than the vehicle body of the vehicle. In other words, the avoidance space determiner 63 does not set the avoidance space outside the lane in which the vehicle is traveling (that is, in a travel lane adjacent to the lane in which the vehicle is traveling), on the sidewalk, at the predicted collision point, or at a point where an obstacle exists. Also, at this time, the avoidance space determiner 63 preferably extracts an area that is a predetermined marginal distance away from the predicted collision point 9a on either side in the vehicle width direction as a possible avoidance area. The marginal distance set with reference to the predicted collision point 9a preferably is set longer on the forward side of the movement direction of the object (in the example in FIG. 2, the right side from the point of view of the motorcycle) compared to the rearward side of the movement direction of the object (in the example in FIG. 2, the left side from the point of view of the motorcycle).

Thus, in the example illustrated in FIG. 2, the avoidance space determiner 63 extracts the two areas of a first possible avoidance area 9b to the left of the predicted collision point 9a from the point of view of the motorcycle and a second possible avoidance area 9c to the right of the predicted collision point 9a from the point of view of the motorcycle as possible avoidance areas. If a plurality of possible avoidance areas 9b and 9c are extracted in this way, the avoidance space determiner 63 determines the most suitable area for avoiding contact with the object from among the plurality of possible avoidance areas 9b and 9c as the avoidance space. As illustrated in FIG. 2, if the object is a crossing pedestrian, the first possible avoidance area 9b on the rearward side of the movement direction of the object has a lower risk of contact than the second possible avoidance area 9c on the forward side of the movement direction of the object. Accordingly, in the example illustrated in FIG. 2, the avoidance space determiner 63 determines the avoidance space with priority given to the first possible avoidance area 9b over the second possible avoidance area 9c. Also, by executing the steering control for emergency avoidance that changes the travel direction of the vehicle body toward the avoidance space determined in this way, after the predicted time to collision, contact between the motorcycle and the object can be avoided, as illustrated in FIG. 3.

If a plurality of possible avoidance areas are extracted as described above, the avoidance space determiner 63 determines the avoidance space so that not only the risk of contact with the object but also the risk of contact with a moving body or the like other than the object and the risk of the vehicle tipping over are lowered, with consideration for the movement direction of the pedestrian as described above in addition to the size of each possible avoidance area, the distance between each possible avoidance area and the sidewalk, the steering control magnitude necessary to change the travel direction of the vehicle body to each possible avoidance area, the existence of other moving bodies, pedestrians, and obstacles in the vicinity of each possible avoidance area, the location of a following vehicle, and the like.

More specifically, if two possible avoidance areas of different sizes are extracted, the avoidance space determiner 63 determines the avoidance space with priority given to the larger possible avoidance area over the smaller possible avoidance area. Also, if two possible avoidance areas with different distances to the sidewalk are extracted, the avoidance space determiner 63 determines the avoidance space with priority given to the possible avoidance area that is more distant from the sidewalk over the possible avoidance area that is less distant from the sidewalk. Consequently, if two possible avoidance areas of equal size are extracted, the avoidance space determiner 63 determines the one more distant from the sidewalk as the avoidance space.

Returning to FIG. 1, if a predetermined condition is met, the attitude controller 64 executes an automated attitude control that operates the rear wheel swaying mechanism 84 automatically to change the position of the vehicle body center of gravity in the vehicle width direction and thereby control the attitude of the vehicle body automatically. Note that a specific procedure of the automated attitude control is described in Japanese Unexamined Patent Application, Publication No. 2021-175638 and No. 2021-175639 submitted by the present applicant, and as such, a detailed description is omitted.

If a predetermined condition is met, the emergency notification controller 65 uses the emergency notification device 5 to send an emergency notification to an emergency notification center.

If a predetermined condition is met, the warning controller 66 activates a warning using the horn, for example, the warning being directed at the object with the possibility of making contact with the vehicle body of the vehicle. Also, if a predetermined condition is met, the warning controller 66 activates warning braking that vibrates the vehicle body, and by extension the part of the rider's body touching the vehicle body, by operating the brake device 83 automatically and intermittently.

FIGS. 4 to 15 are flowcharts illustrating a specific procedure of an emergency braking control by the driver assistance control device 6. Note that in the following, an emergency braking function that is activated with respect to a pedestrian as the object in particular is described in detail. That is, a description of an emergency braking function that is activated with respect to a bicycle, a four-wheeled automobile, or the like as the object is omitted. The flowcharts illustrated in FIGS. 4 to 15 are repeatedly executed on a predetermined control cycle by the driver assistance control device 6 after the rider turns on a main switch, not illustrated, and the driver assistance system 1 is started up. Note that each step illustrated in FIGS. 4 to 15 is achieved by the driver assistance control device 6 executing a computer program stored in a storage device, not illustrated, while the driver assistance system 1 is active.

Figure 4:
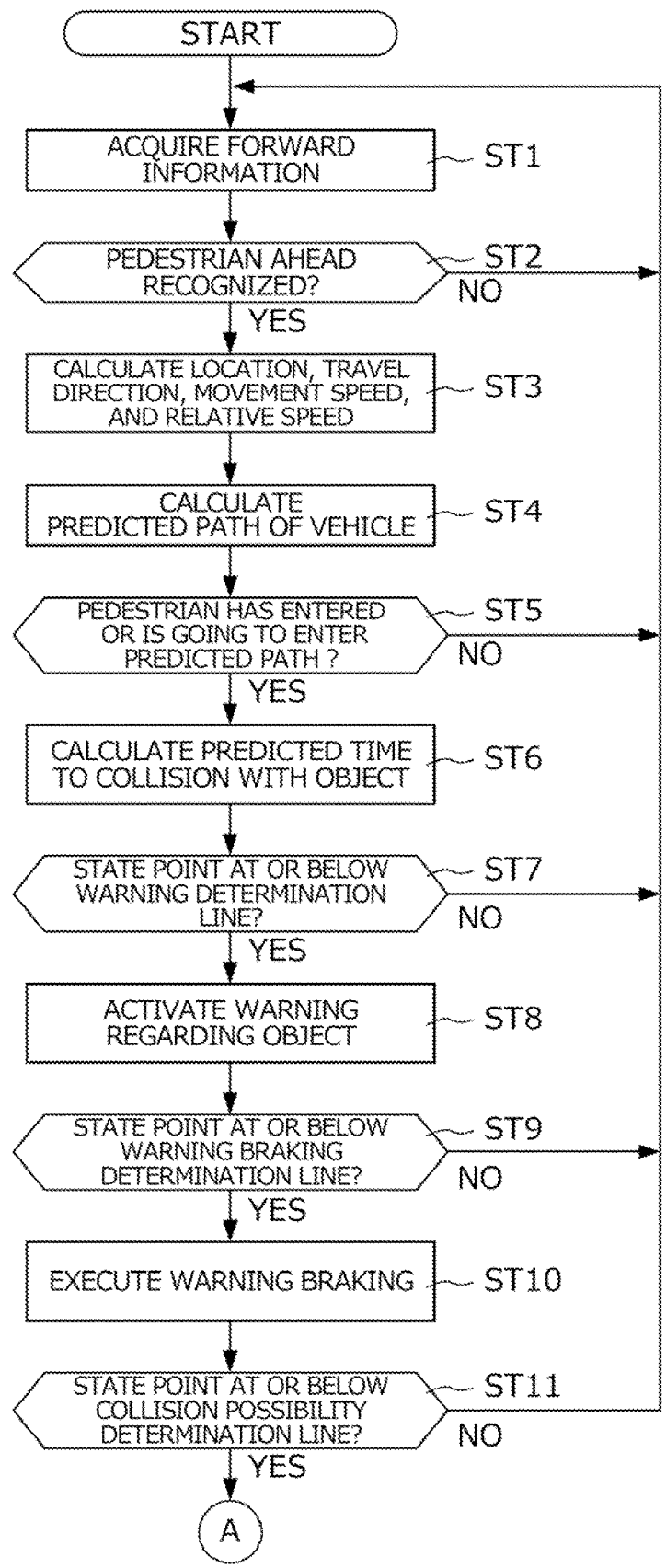
FIG. 4 is a flowchart illustrating a specific procedure of an emergency braking control by a driver assistance control device (from recognition of an object to initiation of a braking control for emergency avoidance or a steering control for emergency avoidance)
Figure 5:
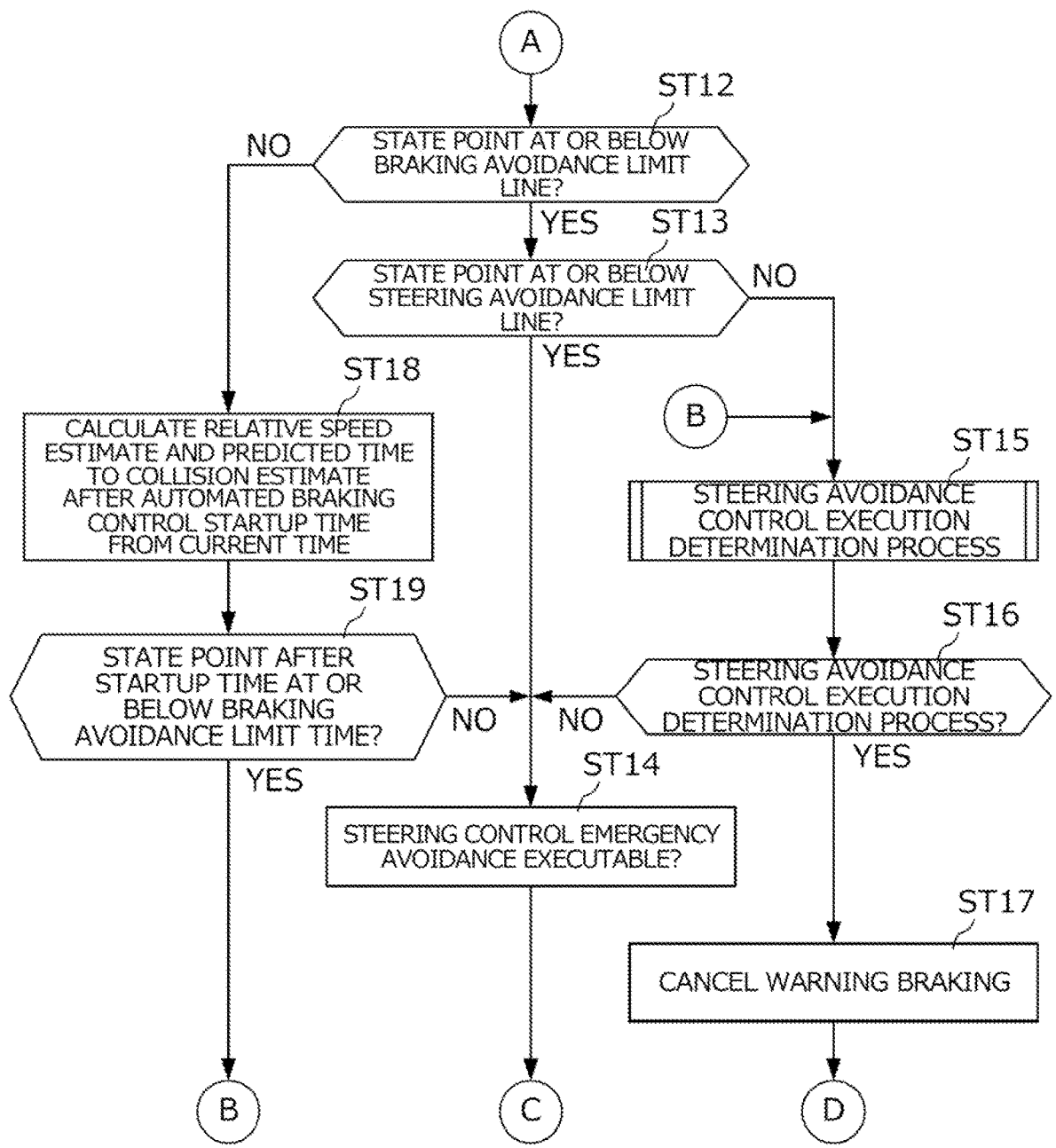
FIG. 5 is a flowchart illustrating a specific procedure of an emergency braking control by a driver assistance control device (from recognition of an object to initiation of a braking control for emergency avoidance or a steering control for emergency avoidance)

FIGS. 4 and 5 are flowcharts illustrating the procedure in the emergency braking control from the recognition of an object to the initiation of either the braking control for emergency avoidance or the steering control for emergency avoidance with respect to the object.

First, in step ST1, the driver assistance control device 6 acquires forward information from the external sensor unit 2, and proceeds to step ST2. In step ST2, the driver assistance control device 6 determines, on the basis of the forward information acquired in step ST1, whether or not a pedestrian is recognized ahead of the vehicle body. If the determination result in step ST2 is YES, the driver assistance control device 6 proceeds to step ST3, and if NO, the driver assistance control device 6 returns to step ST1.

In step ST3, the driver assistance control device 6 calculates the location, travel direction, and movement speed of the pedestrian recognized in step ST2 and the relative speed between the pedestrian and the vehicle on the basis of the forward information and the vehicle speed, and proceeds to step ST4. In step ST4, the driver assistance control device 6 calculates a predicted path of the vehicle on the basis of the steering angle, and proceeds to step ST5.

In step ST5, the driver assistance control device 6 determines, on the basis of the forward information acquired in step ST1 and the information calculated in step ST3, whether or not the pedestrian recognized in step ST2 has entered or is going to enter the predicted path of the vehicle calculated in step ST4. If the determination result in step ST5 is YES, the driver assistance control device 6 proceeds to step ST6, and if NO, the driver assistance control device 6 returns to step ST1. Note that in the following the pedestrian recognized in step ST5 is also simply referred to as the "object".

In step ST6, the driver assistance control device 6 calculates the predicted time to collision, which is the time until the object and the vehicle body are predicted to collide, on the basis of the location, travel direction, and movement speed of the object and the relative speed calculated in step ST3, the predicted path of the vehicle calculated in step ST4, and the like, and proceeds to step ST7.

In step ST7, the driver assistance control device 6 determines, on the basis of the relative speed between the object and the vehicle and the predicted time to collision, whether or not a timing for issuing a warning directed at the object has been reached. More specifically, the driver assistance control device 6 determines whether or not the timing for issuing a warning directed at the object has been reached by determining whether or not the current state point specified by the current relative speed and predicted time to collision is inside the area at or below a warning determination line L1 (that is, the area shorter than the warning determination line L1 on the predicted time to collision axis) defined on a state map (see FIG. 16) with the relative speed on the horizontal axis and predicted time to collision on the vertical axis. If the determination result in step ST7 is YES, the driver assistance control device 6 proceeds to step ST8, and if NO, the driver assistance control device 6 returns to step ST1.

In step ST8, the driver assistance control device 6 activates a warning directed at the object, that is, the pedestrian, and proceeds to step ST9. The warning directed at the object refers to the production of a warning sound using the horn, for example.

Figure 16:
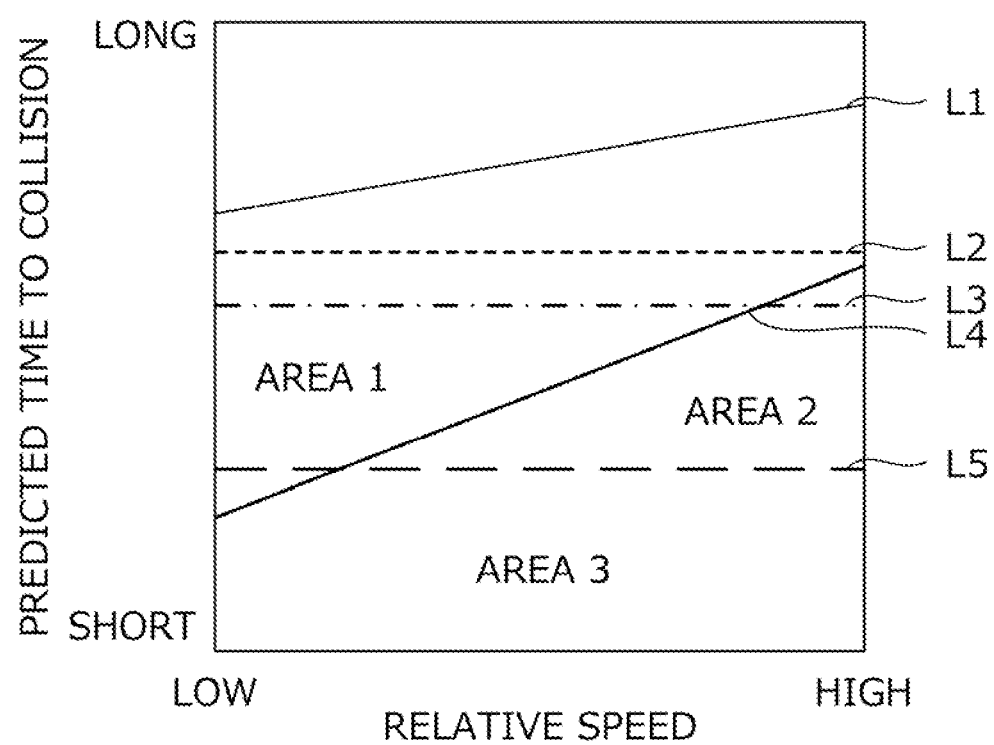
FIG. 16 is a diagram illustrating an example of a map illustrating a warning determination line, a warning braking determination line, a collision possibility determination line, a braking avoidance limit line, and a steering avoidance limit line.

In step ST9, the driver assistance control device 6 determines, on the basis of the relative speed between the object and the vehicle and the predicted time to collision, whether or not a timing for performing warning braking has been reached. More specifically, the driver assistance control device 6 determines whether or not the timing for performing warning braking has been reached by determining whether or not the current state point specified by the current relative speed and predicted time to collision is inside the area at or below a warning braking determination line L2 (that is, the area shorter than the warning braking determination line L2 on the predicted time to collision axis) defined on the state map illustrated as an example in FIG. 16. Note that, as illustrated in FIG. 16, the warning braking determination line L2 is defined on the state map below the warning determination line L1 described above and slightly above the collision possibility determination line L3 described later. Note that the present embodiment describes a case in which the warning braking determination line L2 is constant with respect to the relative speed as illustrated in FIG. 16, for example, or in other words, the warning braking determination line L2 is defined as a threshold (hereinafter also referred to as the "warning braking determination time threshold") with respect to the predicted time to collision, but the present invention is not limited thereto. Accordingly, in step ST9, the driver assistance control device 6 determines whether or not the timing for performing warning braking has been reached by determining whether or not the current predicted time to collision is less than or equal to the warning braking determination time threshold. If the determination result in step ST9 is YES, the driver assistance control device 6 proceeds to step ST10, and if NO, the driver assistance control device 6 returns to step ST1.

In step ST10, the driver assistance control device 6 executes warning braking, and proceeds to step ST11. In step ST11, the driver assistance control device 6 determines whether or not a timing for performing the braking control for emergency avoidance or the steering control for emergency avoidance has been reached. More specifically, the driver assistance control device 6 determines whether or not the timing for performing the braking control for emergency avoidance or the steering control for emergency avoidance has been reached by determining whether or not the current state point specified by the current relative speed and predicted time to collision is inside the area at or below a collision possibility determination line L3 (that is, the area shorter than the collision possibility determination line L3 on the predicted time to collision axis) defined on the state map illustrated as an example in FIG. 16. Note that the present embodiment describes a case in which the collision possibility determination line L3 is constant with respect to the relative speed as illustrated in FIG. 16, for example, or in other words, the collision possibility determination line L3 is defined as a threshold (hereinafter also referred to as the "collision possibility determination time threshold") with respect to the predicted time to collision, but the present invention is not limited thereto. Accordingly, in step ST11, the driver assistance control device 6 determines whether or not the timing for performing the braking control for emergency avoidance or the steering control for emergency avoidance has been reached by determining whether or not the current predicted time to collision is less than or equal to the collision possibility determination time threshold.

Also, the collision possibility determination line L3 is set in the area above a limit (namely, a steering avoidance limit line L5 described later) at which contact with the object can be avoided if the steering control for emergency avoidance is executed, for example. If the determination result in step ST11 is YES, the driver assistance control device 6 proceeds to step ST12 (see FIG. 5), and if NO, the driver assistance control device 6 returns to step ST1.

As illustrated in FIG. 5, in step S12, the driver assistance control device 6 determines whether or not the current state point specified by the current relative speed and predicted time to collision is inside the area at or below a braking avoidance limit line L4 (that is, the area shorter than the braking avoidance limit line L4 on the predicted time to collision axis) defined on the state map illustrated as an example in FIG. 16. The braking avoidance limit line L4 is the line obtained by plotting state points on the limit at which contact with the object can be avoided if the braking control for emergency avoidance is executed. Accordingly, determining whether or not the current state point is inside the area at or below the braking avoidance limit line L4 may be considered equivalent to determining whether or not contact with the object could be avoided if the braking control for emergency avoidance is executed now.

Also, as illustrated in FIG. 16, the relative speed on such a braking avoidance limit line L4 is lower as the predicted time to collision is shorter. In other words, if the braking avoidance limit line L4 is defined as a speed threshold with respect to the relative speed, the speed threshold is set to a smaller value as the predicted time to collision is shorter. Accordingly, in step ST12, the driver assistance control device 6 can determine whether or not the current state point is inside the area at or below the braking avoidance limit line L4 by determining whether or not the current relative speed is equal to or greater than a speed threshold set on the basis of the current predicted time to collision.

Also, as illustrated in FIG. 16, the predicted time to collision on the braking avoidance limit line L4 is shorter as the relative speed is lower. In other words, if the braking avoidance limit line L4 is defined as a time threshold with respect to the predicted time to collision, the time threshold is set to a smaller value as the relative speed is lower. Accordingly, in step ST12, the driver assistance control device 6 can determine whether or not the current state point is inside the area at or below the braking avoidance limit line L4 by determining whether or not the current predicted time to collision is less than or equal to a time threshold set on the basis of the current relative speed.

If the determination result in step ST12 is YES, that is, in the case of determining that there is a possibility that contact with the object may be unavoidable even if the braking control for emergency avoidance is initiated now, the driver assistance control device 6 proceeds to step ST13. Also, if the determination result in step ST12 is NO, that is, in the case of determining that there is a high likelihood that contact with the object could be avoided if the braking control for emergency avoidance is initiated now, the driver assistance control device 6 proceeds to step ST18.

In step S13, the driver assistance control device 6 determines whether or not the current state point specified by the current relative speed and predicted time to collision is inside the area at or below a steering avoidance limit line L5 (that is, the area shorter than the steering avoidance limit line L5 on the predicted time to collision axis) defined on the state map illustrated as an example in FIG. 16. The steering avoidance limit line L5 is the line obtained by plotting state points on the limit at which contact with the object can be avoided if the steering control for emergency avoidance is executed. Accordingly, determining whether or not the current state point is inside the area at or below the steering avoidance limit line L5 may be considered equivalent to determining whether or not contact with the object could not be avoided if the steering control for emergency avoidance is executed now.

Note that the present embodiment describes a case in which the steering avoidance limit line L5 is constant with respect to the relative speed as illustrated in FIG. 16, for example, or in other words, the steering avoidance limit line L5 is defined as a threshold (hereinafter also referred to as the "steering avoidance limit time threshold") with respect to the predicted time to collision, but the present invention is not limited thereto. Accordingly, in step ST13, the driver assistance control device 6 determines whether or not the current state point is inside the area at or below the steering avoidance limit line L5 by determining whether or not the current predicted time to collision is less than or equal to the steering avoidance limit time threshold.

Also, as illustrated in FIG. 16, the steering avoidance limit line L5 exists on the side shorter than the braking avoidance limit line L4 on the predicted time to collision axis in the area of high relative speed, and exists on the side longer than the braking avoidance limit line L4 on the predicted time to collision axis in the area of low relative speed. For this reason, the area at or below the collision possibility determination line L3 is divided into an area 1 between the collision possibility determination line L3 and the braking avoidance limit line L4, an area 2 enclosed by the collision possibility determination line L3, the braking avoidance limit line L4, and the steering avoidance limit line L5, and an area 3 at or below the braking avoidance limit line L4 and the steering avoidance limit line L5.

The area 1 is the area where there is a high likelihood that contact with the object can be avoided if at least the braking control for emergency avoidance is executed. The area 2 is the area where there is a possibility that contact with the object may be unavoidable even if the braking control for emergency avoidance is executed, but there is a high likelihood that contact with the object can be avoided if the steering control for emergency avoidance is executed. The area 3 is the area where there is a possibility that contact with the object may be unavoidable even if the braking control for emergency avoidance and the steering control for emergency avoidance are both executed.

If the determination result in step ST13 is YES, that is, in the case of determining that there is a possibility that contact with the object may be unavoidable even if the braking control for emergency avoidance and the steering control for emergency avoidance are both initiated now, the driver assistance control device 6 proceeds to step ST14. Also, if the determination result in step ST12 is NO, that is, in the case of determining that there is a high likelihood that contact with the object could be avoided if the braking control for emergency avoidance is initiated now, the driver assistance control device 6 proceeds to step ST18.

Figure 7:
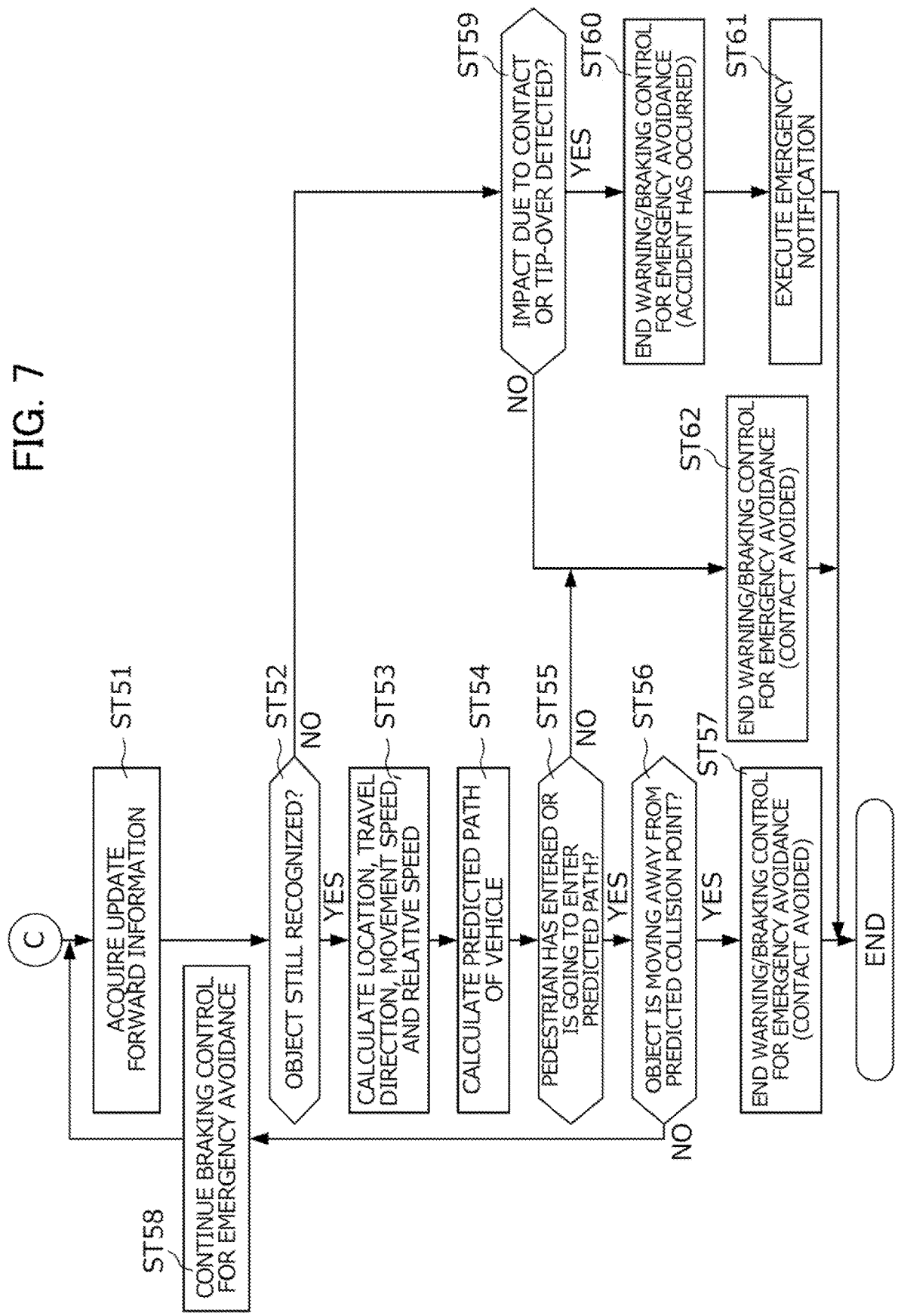
FIG. 7 is a flowchart illustrating a specific procedure of an emergency braking control by a driver assistance control device (after initiation of the braking control for emergency avoidance)

In step ST14, the driver assistance control device 6, in response to the determination that the current state point is inside the area 3, initiates the braking control for emergency avoidance, and proceeds to step ST51 (see FIG. 7). When initiating the braking control for emergency avoidance, to keep the vehicle behavior from becoming unstable, the driver assistance control device 6 preferably changes the control magnitude (for example, the brake control input) for the automated braking control gradually over an automated braking control startup time set according to the current state of the vehicle body (such as the vehicle speed and acceleration, for example).

In step ST15, the driver assistance control device 6, in response to the determination that the current state point is inside the area 2, executes a steering avoidance control execution determination process for determining whether or not the steering control for emergency avoidance can be executed, and proceeds to step ST16. Note that a specific procedure of the steering avoidance control execution determination process will be described later with reference to FIG. 6.

In step ST16, the driver assistance control device 6 references the result of the process in step ST15 to determine whether or not the steering control for emergency avoidance can be executed. If the determination result in step ST16 is NO, that is, if the steering control for emergency avoidance cannot be executed, the driver assistance control device 6 proceeds to step ST14 and initiates the braking control for emergency avoidance.

Also, if the determination result in step ST16 is YES, that is, if the steering control for emergency avoidance can be executed, the driver assistance control device 6 proceeds to step ST17. In step ST17, the warning braking in progress is canceled, and the flow proceeds to step ST71 (see FIG. 8) to initiate the steering control for emergency avoidance.

In step ST18, the driver assistance control device 6, in response to the determination that the current state point is inside the area 1, calculates the relative speed and the predicted time to collision after the automated braking control startup time described above from the current point in time (in step ST11, the point in time when the state point is determined to be at or below the collision possibility determination line L3) as a relative speed estimate and a predicted time to collision estimate, respectively, and proceeds to step ST19.

In step ST19, the driver assistance control device 6 determines whether or not the state point after the automated braking control startup time specified by the relative speed estimate and the predicted time to collision estimated calculated in step ST18 is inside the area at or below the braking avoidance limit line L4 defined on the state map illustrated as an example in FIG. 16. Since the specific procedure for determining whether or not the state point is inside the area at or below the braking avoidance limit line L4 in step ST19 is the same as in step ST12 described above, a detailed description is omitted.

If the determination result in step ST19 is YES, that is, in the case of determining that the current state point is inside the area 1 but the state point after the automated braking control startup time will move into the area 2, the driver assistance control device 6 proceeds to step ST15 to execute the steering control for emergency avoidance.

If the determination result in step ST19 is NO, that is, in the case that the current state point and the state point after the automated braking control startup time are both inside the area 1, the driver assistance control device 6 proceeds to step ST14 to execute the braking control for emergency avoidance.

Figure 6:
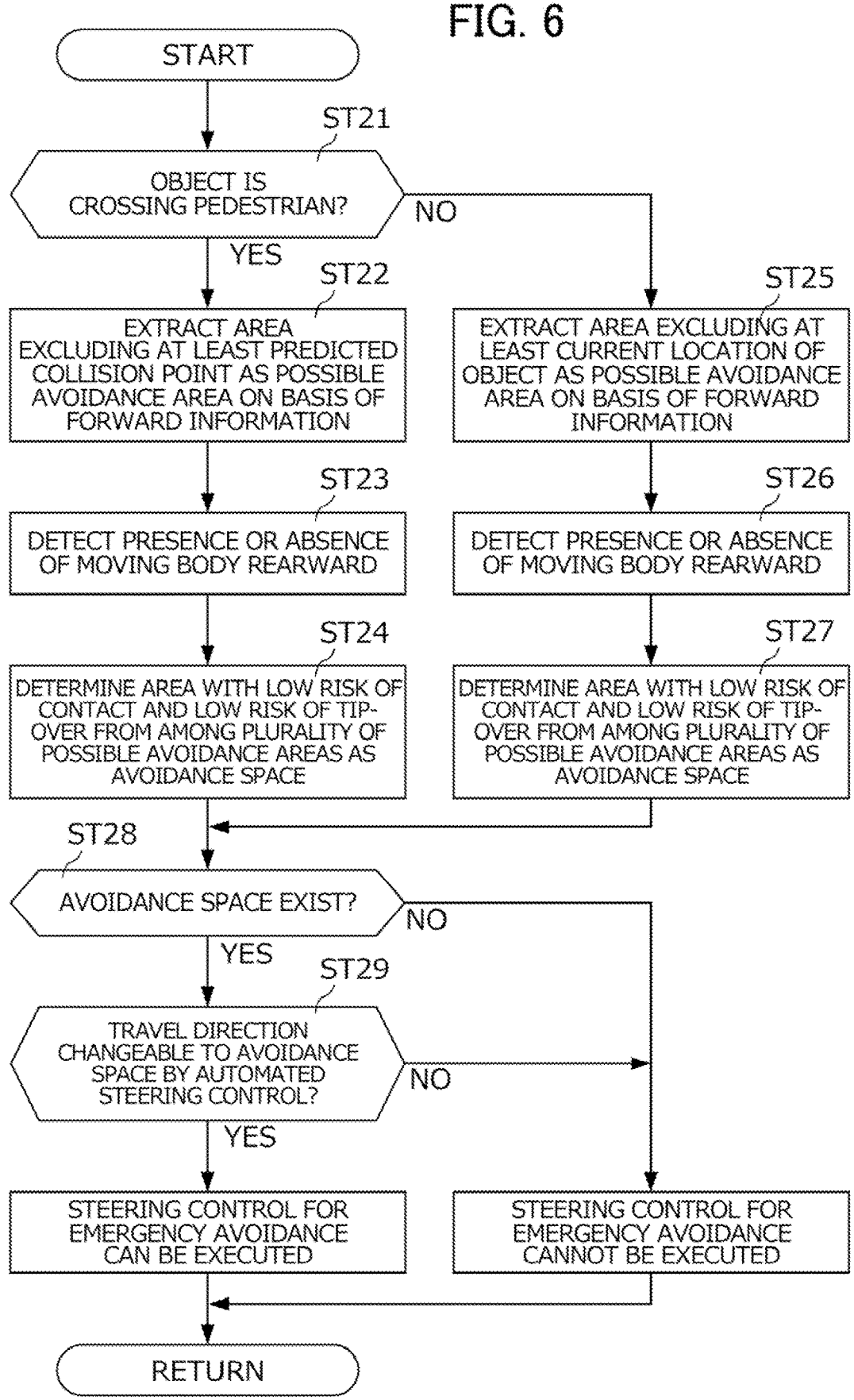
FIG. 6 is a flowchart illustrating a specific procedure of an emergency braking control by a driver assistance control device (steering avoidance control execution determination process)

FIG. 6 is a flowchart illustrating a specific procedure of the steering avoidance control execution determination process.

First, in step ST21, the driver assistance control device 6 determines whether or not the object is a crossing pedestrian who is crossing the road. If the determination result in step ST21 is YES, the driver assistance control device 6 proceeds to step ST22, and if NO, the driver assistance control device 6 proceeds to step ST25.

In step ST22, the driver assistance control device 6 extracts, as a possible avoidance area on the basis of the forward information, at least one area from within the lane in which the vehicle is traveling or on the road other than the sidewalk, which excludes the predicted collision point (the point where the object which is a crossing pedestrian is estimated to be after the predicted time to collision) and a point where an obstacle exists, and which is bigger than the vehicle body of the vehicle, and proceeds to step ST23.

In step ST23, the driver assistance control device 6 detects the presence or absence of a moving body rearward on the basis of rearward information acquired by the external sensor unit 2, and proceeds to step ST24.

In step ST24, the driver assistance control device 6 determines the possible avoidance area with the lowest risk of contact with the object and another moving body or the like and the lowest risk of vehicle tip-over from among the plurality of possible avoidance areas extracted in step ST22 as the avoidance space, and proceeds to step ST28. In particular, if a plurality of possible avoidance areas are extracted at this time, the driver assistance control device 6 preferably determines the avoidance space with priority given to the possible avoidance area on the rearward side of the movement direction of the object which is a crossing pedestrian.

On the other hand, in step ST25, the driver assistance control device 6 extracts, as a possible avoidance area on the basis of the forward information, at least one area from within the lane in which the vehicle is traveling or on the road other than the sidewalk, which excludes the point where the object currently exists (the object is not a crossing pedestrian and therefore has little movement in the vehicle width direction) and a point where an obstacle exists, and which is bigger than the vehicle body of the vehicle, and proceeds to step ST26.

In step ST26, the driver assistance control device 6 detects the presence or absence of a moving body rearward on the basis of rearward information acquired by the external sensor unit 2, and proceeds to step ST27.

In step ST27, the driver assistance control device 6 determines the possible avoidance area with the lowest risk of contact with the object and another moving body or the like and the lowest risk of vehicle tip-over from among the plurality of possible avoidance areas extracted in step ST25 as the avoidance space, and proceeds to step ST28. In particular, if a plurality of possible avoidance areas are extracted at this time, the driver assistance control device 6 preferably determines the avoidance space with priority given to the bigger possible avoidance area or the possible avoidance area that is more distant from the sidewalk.

In step ST28, the driver assistance control device 6 determines whether or not the avoidance space has been determined, or in other words, whether or not an avoidance space exists in which the risk of contact with the object and another moving body or the like and the risk of vehicle tip-over can be lowered. If the determination result in step ST28 is YES, the driver assistance control device 6 proceeds to step ST29, and if NO, the driver assistance control device 6 proceeds to step ST31.

In step ST29, the driver assistance control device 6 determines whether or not the travel direction of the vehicle body of the vehicle can be changed to the determined avoidance space by executing the automated steering control. If the determination result in step ST29 is YES, the driver assistance control device 6 proceeds to step ST30, and if NO, the driver assistance control device 6 proceeds to step ST31.

In step ST30, the driver assistance control device 6 determines that the steering control for emergency avoidance can be executed, and proceeds to step ST16 (see FIG. 5). Also, in step ST31, the driver assistance control device 6 determines that the steering control for emergency avoidance cannot be executed, and proceeds to step ST16 (see FIG. 5).

FIG. 7 is a flowchart illustrating the procedure of the process after the braking control for emergency avoidance is initiated in the emergency braking control.

As illustrated in FIG. 7, in step ST51, the driver assistance control device 6 acquires updated forward information from the external sensor unit 2, and proceeds to step ST52. In step ST52, the driver assistance control device 6 determines, on the basis of the updated forward information acquired in step ST51, whether or not the object can still be recognized. If the determination result in step ST52 is YES, the driver assistance control device 6 proceeds to step ST53. In step ST53, the driver assistance control device 6 calculates the location of the object, the travel direction of the object, the movement speed of the object in the travel direction, and the relative speed between the object and the vehicle on the basis of the forward information and the vehicle speed, and proceeds to step ST54.

In step ST54, the driver assistance control device 6 calculates a predicted path of the vehicle on the basis of the steering angle, and proceeds to step ST55. In step ST55, the driver assistance control device 6 determines, on the basis of the updated forward information acquired in step ST51, whether or not the pedestrian recognized in step ST52 has entered or is going to enter the predicted path of the vehicle calculated in step ST54. If the determination result in step ST55 is YES, the driver assistance control device 6 proceeds to step ST56.

In step ST56, the driver assistance control device 6 determines, on the basis of the information calculated in step ST53, whether or not the object is moving away from the predicted collision point. If the determination result in step ST56 is YES, the driver assistance control device 6 proceeds to step ST57.

In step ST57, the driver assistance control device 6 determines that contact between the vehicle body and the object is avoided due to the travel direction of the object, ends the warning and the braking control for emergency avoidance in progress, and ends the emergency braking control.

Also, if the determination result in step ST56 is NO, the driver assistance control device 6 proceeds to step ST58. In step ST58, the driver assistance control device 6 continues to execute the braking control for emergency avoidance, and returns to step ST51.

Also, if the determination result in step ST52 is NO, that is, if the object can no longer be detected, the driver assistance control device 6 proceeds to step ST59. In step ST59, the driver assistance control device 6 determines, on the basis of the acceleration measured by the inertial measurement device 32, whether or not an impact due to contact between the vehicle body and the object or an impact due to the vehicle body tipping over is detected. If the determination result in step ST59 is YES, the driver assistance control device 6 proceeds to step ST60.

In step ST60, the driver assistance control device 6 determines that an accident has occurred, ends the warning and the braking control for emergency avoidance in progress, and proceeds to step ST61. In step ST61, the driver assistance control device 6 uses the emergency notification device 5 to send an emergency notification to the emergency notification center, and then ends the emergency braking control.

Also, if at least one of the determination results in step ST55 and step ST59 is NO, the driver assistance control device 6 proceeds to step ST62. In step ST62, the driver assistance control device 6 determines that contact between the vehicle body and the object is avoided due to the deceleration of the object, ends the warning and the braking control for emergency avoidance in progress, and ends the emergency braking control.

Figure 8:
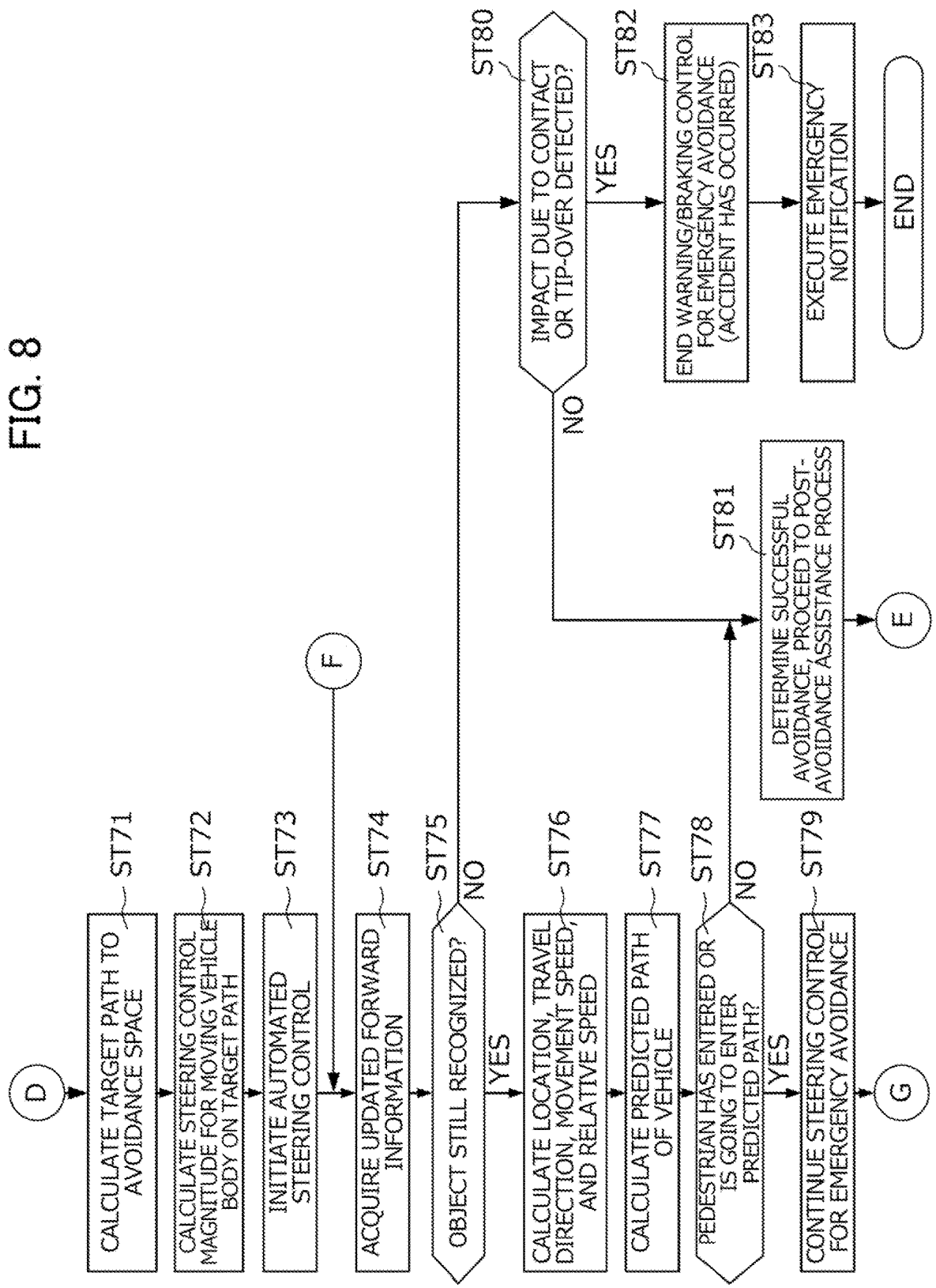
FIG. 8 is a flowchart illustrating a specific procedure of an emergency braking control by a driver assistance control device (steering control for emergency avoidance)
Figure 9:
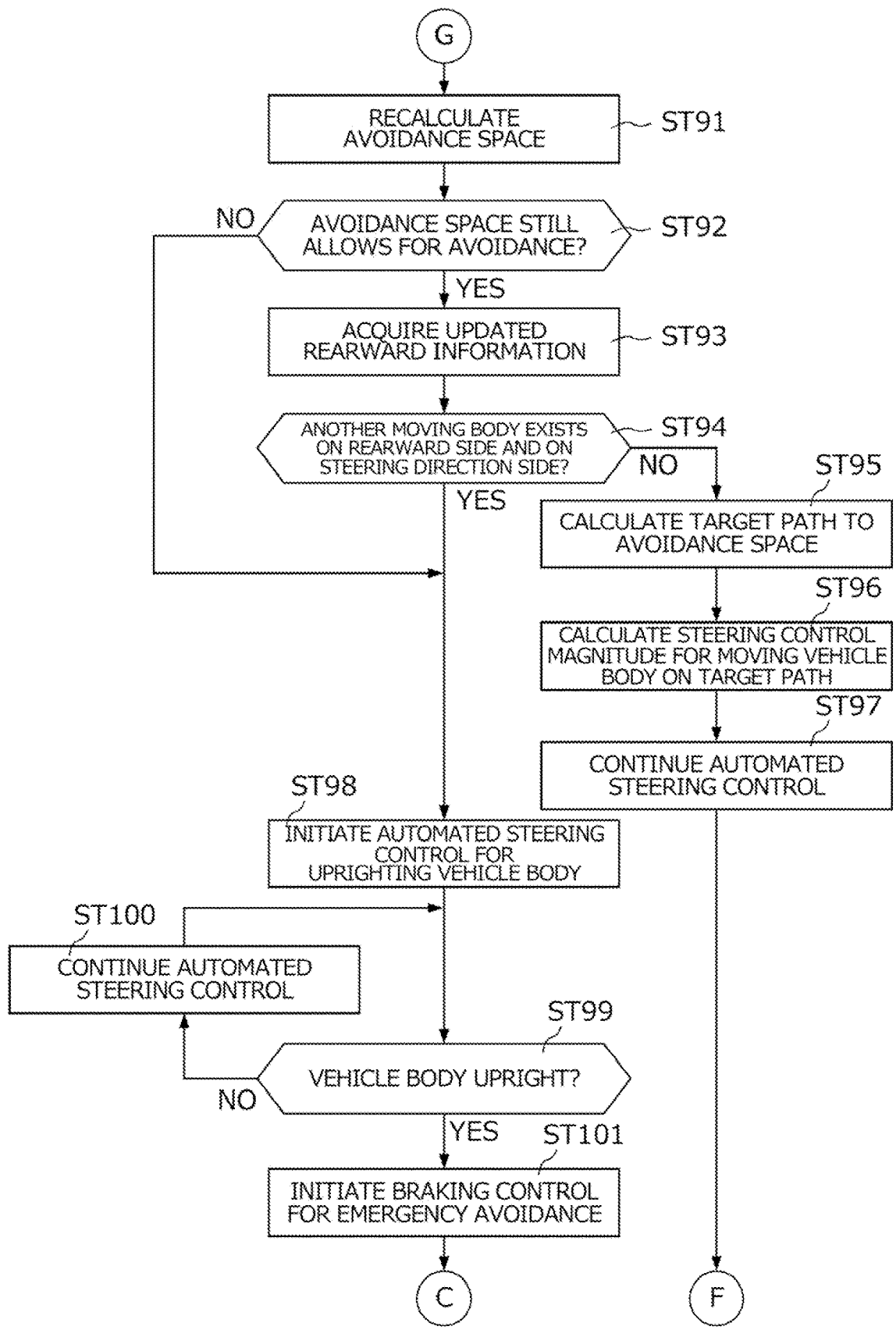
FIG. 9 is a flowchart illustrating a specific procedure of an emergency braking control by a driver assistance control device (steering control for emergency avoidance)

FIGS. 8 and 9 are flowcharts illustrating a specific procedure of the steering control for emergency avoidance.

As illustrated in FIG. 8, in step ST71, the driver assistance control device 6 calculates a target path of the vehicle body to the avoidance space determined by the process in FIG. 6, and proceeds to step ST72. In step ST72, the driver assistance control device 6 calculates the steering control magnitude for moving the vehicle body on the target path, and proceeds to step ST73. In step ST73, the driver assistance control device 6 initiates the automated steering control on the basis of the steering control magnitude calculated in step ST72, and proceeds to step ST74.

In step ST74, the driver assistance control device 6 acquires updated forward information from the external sensor unit 2, and proceeds to step ST75. In step ST75, the driver assistance control device 6 determines, on the basis of the updated forward information acquired in step ST74, whether or not the object can still be recognized. If the determination result in step ST75 is YES, the driver assistance control device 6 proceeds to step ST76, and if NO, the driver assistance control device 6 proceeds to step ST80.

In step ST76, the driver assistance control device 6 calculates the location of the object, the travel direction of the object, the movement speed of the object in the travel direction, and the relative speed between the object and the vehicle on the basis of the forward information and the vehicle speed, and proceeds to step ST77. In step ST77, the driver assistance control device 6 calculates a predicted path of the vehicle on the basis of the steering angle, and proceeds to step ST78. In step ST78, the driver assistance control device 6 determines, on the basis of the updated forward information acquired in step ST74, whether or not the pedestrian recognized in step ST75 has entered or is going to enter the predicted path of the vehicle calculated in step ST77. If the determination result in step ST78 is YES, the driver assistance control device 6 proceeds to step ST79, and if NO, the driver assistance control device 6 proceeds to step ST81.

In step ST79, the driver assistance control device 6 determines that it is necessary to continue executing the steering control for emergency avoidance with respect to the object, and proceeds to step ST91 (see FIG. 9).

In step ST80, the driver assistance control device 6 determines, on the basis of the acceleration measured by the inertial measurement device 32, whether or not an impact due to contact between the vehicle body and the object or an impact due to the vehicle body tipping over is detected. If the determination result in step ST80 is NO, the driver assistance control device 6 proceeds to step ST81, and if YES, the driver assistance control device 6 proceeds to step ST82.

Figure 10:
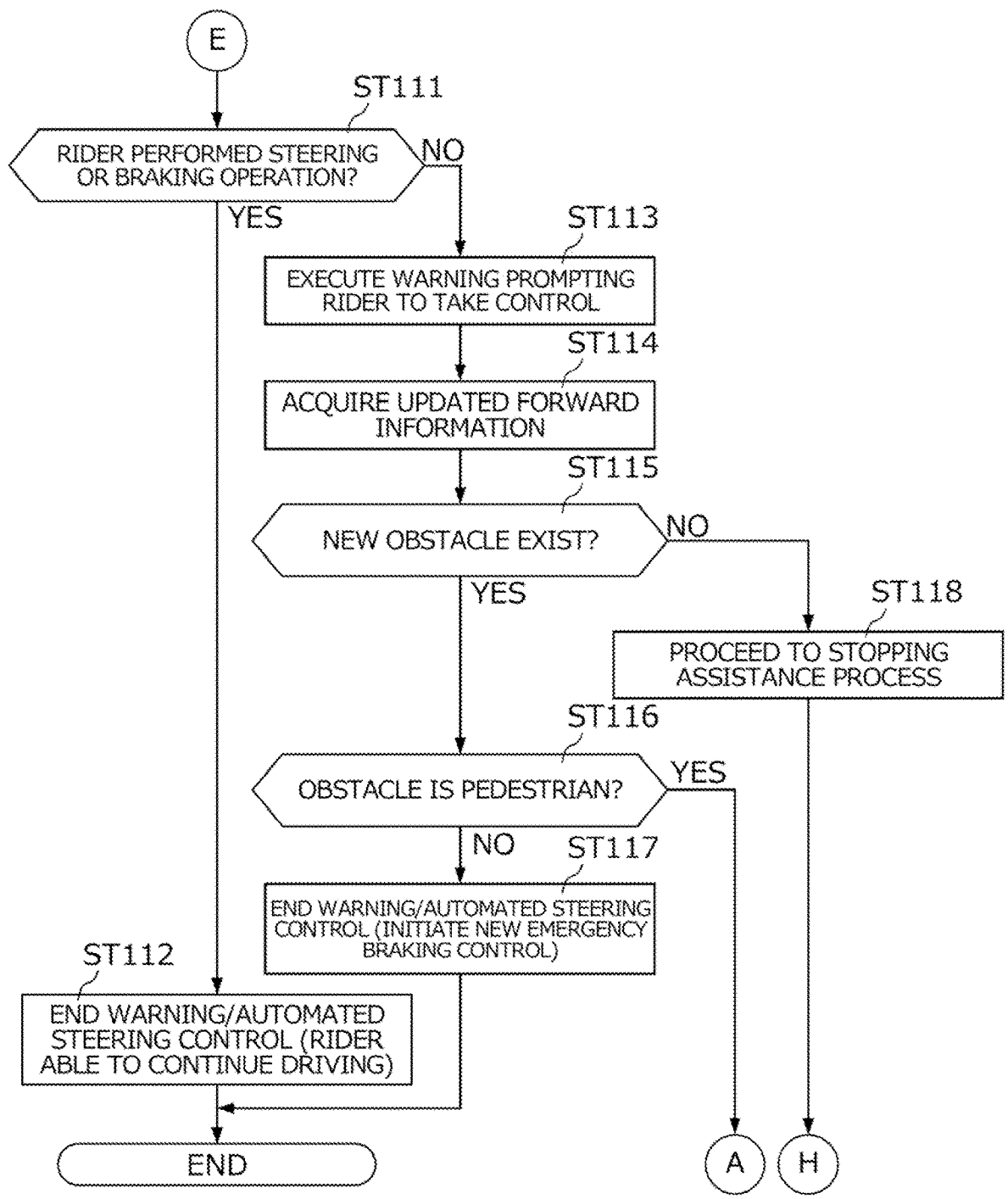
FIG. 10 is a flowchart illustrating a specific procedure of an emergency braking control by a driver assistance control device (post-avoidance assistance process)

In step ST81, the driver assistance control device 6 determines that contact with the object is successfully avoided, proceeds to a post-avoidance assistance process, and proceeds to step ST111 (see FIG. 10).

In step ST82, the driver assistance control device 6 determines that an accident has occurred, ends the warning and the braking control for emergency avoidance in progress, and proceeds to step ST83. In step ST83, the driver assistance control device 6 uses the emergency notification device 5 to send an emergency notification to the emergency notification center, and then ends the emergency braking control.

As illustrated in FIG. 9, in step ST91, the driver assistance control device 6 recalculates the avoidance space on the basis of the updated forward information acquired in step ST74, and proceeds to step ST92. In step ST92, the driver assistance control device 6 determines whether or not the recalculated avoidance space still allows for avoidance. If the determination result in step ST92 is YES, the driver assistance control device 6 proceeds to step ST93.

In step ST93, the driver assistance control device 6 acquires updated rearward information from the external sensor unit 2, and proceeds to step ST94. In step ST94, the driver assistance control device 6 determines, on the basis of the updated rearward information acquired in step ST93, whether or not another moving body exists on the rearward side and on the steering direction side of the automated steering control. If the determination result in step ST94 is NO, the driver assistance control device 6 proceeds to step ST95.

In step ST95, the driver assistance control device 6 calculates a target path of the vehicle body to the avoidance space calculated in step ST91, and proceeds to step ST96. In step ST96, the driver assistance control device 6 calculates the steering control magnitude for moving the vehicle body on the target path, and proceeds to step ST97. In step ST97, the driver assistance control device 6 continues to execute the automated steering control on the basis of the steering control magnitude calculated in step ST96, and proceeds to step ST74 (see FIG. 8).

If the determination result in step ST92 described above is NO, the driver assistance control device 6 aborts the steering control for emergency avoidance in progress, and proceeds to step ST98 to switch to the braking control for emergency avoidance. In a situation just before impact, changing the travel direction of the vehicle body is difficult in some cases. In such cases, rapidly aborting the steering control for emergency avoidance and switching to the braking control for emergency avoidance may lessen the damage to both parties. Also, if the determination result in step ST94 described above is YES, that is, if another moving body exists on the rearward side and on the steering direction side, the driver assistance control device 6 aborts the steering control for emergency avoidance in progress, and proceeds to step ST98 to switch to the braking control for emergency avoidance.

In step ST98, the driver assistance control device 6 initiates the automated steering control for uprighting the vehicle body, and proceeds to step ST99. At this time, the driver assistance control device 6 may also upright the vehicle body through a combination of the automated steering control and the automated attitude control.

In step ST99, the driver assistance control device 6 determines whether or not the vehicle body is upright. If the determination result in step ST99 is NO, the driver assistance control device 6 proceeds to step ST100, and if YES, the driver assistance control device 6 proceeds to step ST101. In step ST100, the driver assistance control device 6 continues to execute the automated steering control for uprighting the vehicle body, and returns to step ST99. In step ST101, the driver assistance control device 6 initiates the braking control for emergency avoidance, and proceeds to step ST51 (see FIG. 7).

FIGS. 10 to 15 are flowcharts illustrating a specific procedure of the post-avoidance assistance process.

As illustrated in FIG. 10, in step ST111, the driver assistance control device 6 determines whether or not the rider performs a steering operation or a braking operation while the steering control for emergency avoidance is being executed. If the determination result in step ST111 is YES, the driver assistance control device 6 proceeds to step ST112, and if NO, the driver assistance control device 6 proceeds to step ST113.

In step ST112, the driver assistance control device 6 determines that the rider is able to continue driving, ends the warning and the automated steering control in progress, and ends the emergency braking control.

In step ST113, the driver assistance control device 6 executes a warning prompting the rider to take control, and proceeds to step ST114. The warning for prompting the rider to take control may be warning braking, for example. In step ST114, the driver assistance control device 6 acquires updated forward information from the external sensor unit 2, and proceeds to step ST115. In step ST115, the driver assistance control device 6 determines, on the basis of the updated forward information acquired in step ST114, whether or not a new obstacle with a possibility of collision exists ahead of the vehicle body. If the determination result in step ST115 is YES, the driver assistance control device 6 proceeds to step ST116, and if NO, the driver assistance control device 6 proceeds to step ST118.

In step ST116, the driver assistance control device 6 determines whether or not the obstacle recognized in step ST115 is a pedestrian. If the determination result in step ST116 is YES, the driver assistance control device 6 returns to step ST1 (see FIG. 4) to resume the emergency braking control with respect to the new pedestrian as the object. Also, if the determination result in step ST116 is NO, the driver assistance control device 6 proceeds to step ST117. In step ST117, the driver assistance control device 6 ends the warning and the automated steering control in progress and ends the emergency braking control to initiate the emergency braking control with respect to the new obstacle as the object.

Figure 11:
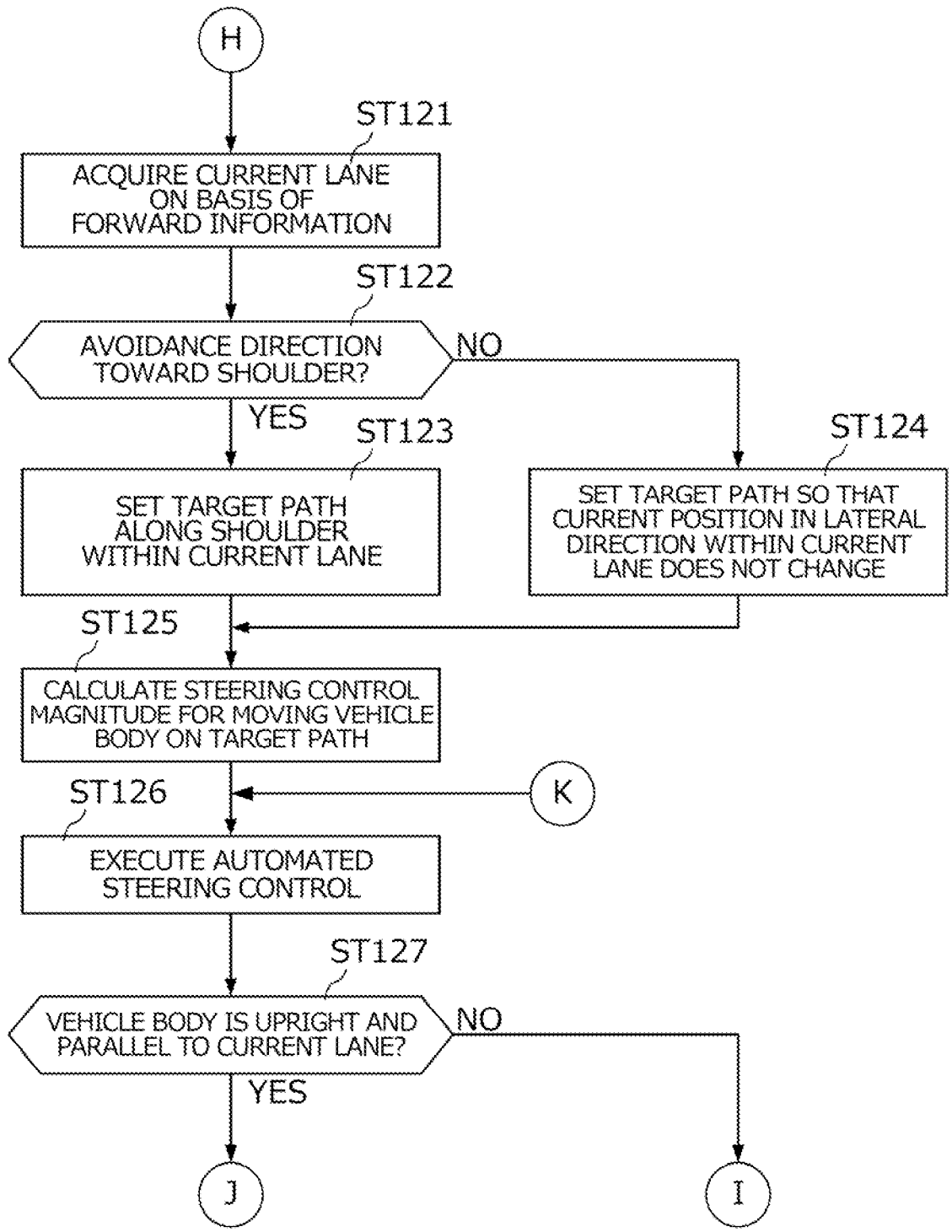
FIG. 11 is a flowchart illustrating a specific procedure of an emergency braking control by a driver assistance control device (post-avoidance assistance process)

In step ST118, the driver assistance control device 6 proceeds to a stopping assistance process for safely stopping the vehicle body, and proceeds to step ST121 (see FIG. 11).

As illustrated in FIG. 11, in step ST121, the driver assistance control device 6 acquires the current lane (that is, the lane markings defining the current lane and an adjacent lane) on the basis of the updated forward information acquired in step ST114, and proceeds to step ST122. In step ST122, the driver assistance control device 6 determines whether or not the avoidance direction of the steering control for emergency avoidance is toward the shoulder. If the determination result in step ST121 is YES, the driver assistance control device 6 proceeds to step ST123, and if NO, the driver assistance control device 6 proceeds to step ST124.

In step ST123, the driver assistance control device 6 sets the target path of the vehicle body along the shoulder within the current lane so that the rider's own vehicle does not obstruct a following vehicle, and proceeds to step ST125.

In step ST124, the driver assistance control device 6 sets the target path of the vehicle body so that the current position in the lateral direction within the current lane does not change, and proceeds to step ST125.

In step ST125, the driver assistance control device 6 calculates the steering control magnitude for moving the vehicle body on the calculated target path, and proceeds to step ST126. In step ST126, the driver assistance control device 6 executes the automated steering control on the basis of the calculated steering control magnitude, and proceeds to step ST127.

In step ST127, the driver assistance control device 6 determines whether or not the vehicle body is upright in a state parallel to the current lane. If the determination result in step ST127 is YES, the driver assistance control device 6 proceeds to step ST161 (see FIG. 14), and if NO, the driver assistance control device 6 proceeds to step ST131 (see FIG. 12).

Figure 12:
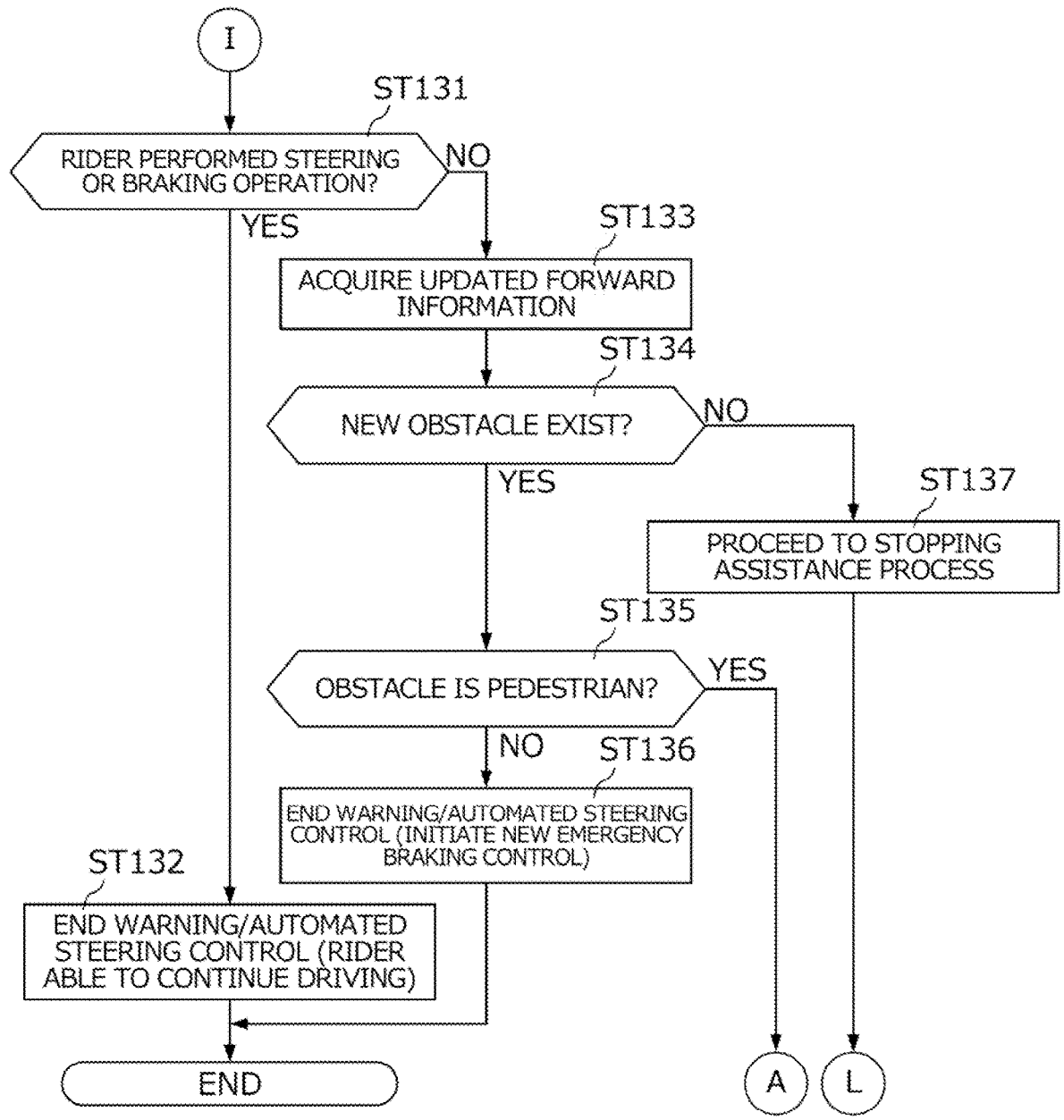
FIG. 12 is a flowchart illustrating a specific procedure of an emergency braking control by a driver assistance control device (post-avoidance assistance process)

As illustrated in FIG. 12, in step ST131, the driver assistance control device 6 determines whether or not the rider has performed a steering operation or a braking operation since the initiation of the post-avoidance assistance process illustrated in FIGS. 10 to 15. If the determination result in step ST131 is YES, the driver assistance control device 6 proceeds to step ST132, and if NO, the driver assistance control device 6 proceeds to step ST133.

In step ST132, the driver assistance control device 6 determines that the rider is able to continue driving, ends the warning and the automated steering control in progress, and ends the emergency braking control.

In step ST133, the driver assistance control device 6 acquires updated forward information from the external sensor unit 2, and proceeds to step ST134. In step ST134, the driver assistance control device 6 determines, on the basis of the updated forward information acquired in step ST133, whether or not a new obstacle with a possibility of collision exists ahead of the vehicle body. If the determination result in step ST134 is YES, the driver assistance control device 6 proceeds to step ST135, and if NO, the driver assistance control device 6 proceeds to step ST137.

In step ST135, the driver assistance control device 6 determines whether or not the obstacle recognized in step ST134 is a pedestrian. If the determination result in step ST135 is YES, the driver assistance control device 6 returns to step ST1 (see FIG. 4) to resume the emergency braking control with respect to the new pedestrian as the object. Also, if the determination result in step ST135 is NO, the driver assistance control device 6 proceeds to step ST136. In step ST136, the driver assistance control device 6 ends the warning and the automated steering control in progress and ends the emergency braking control to initiate the emergency braking control with respect to the new obstacle as the object.

Figure 13:
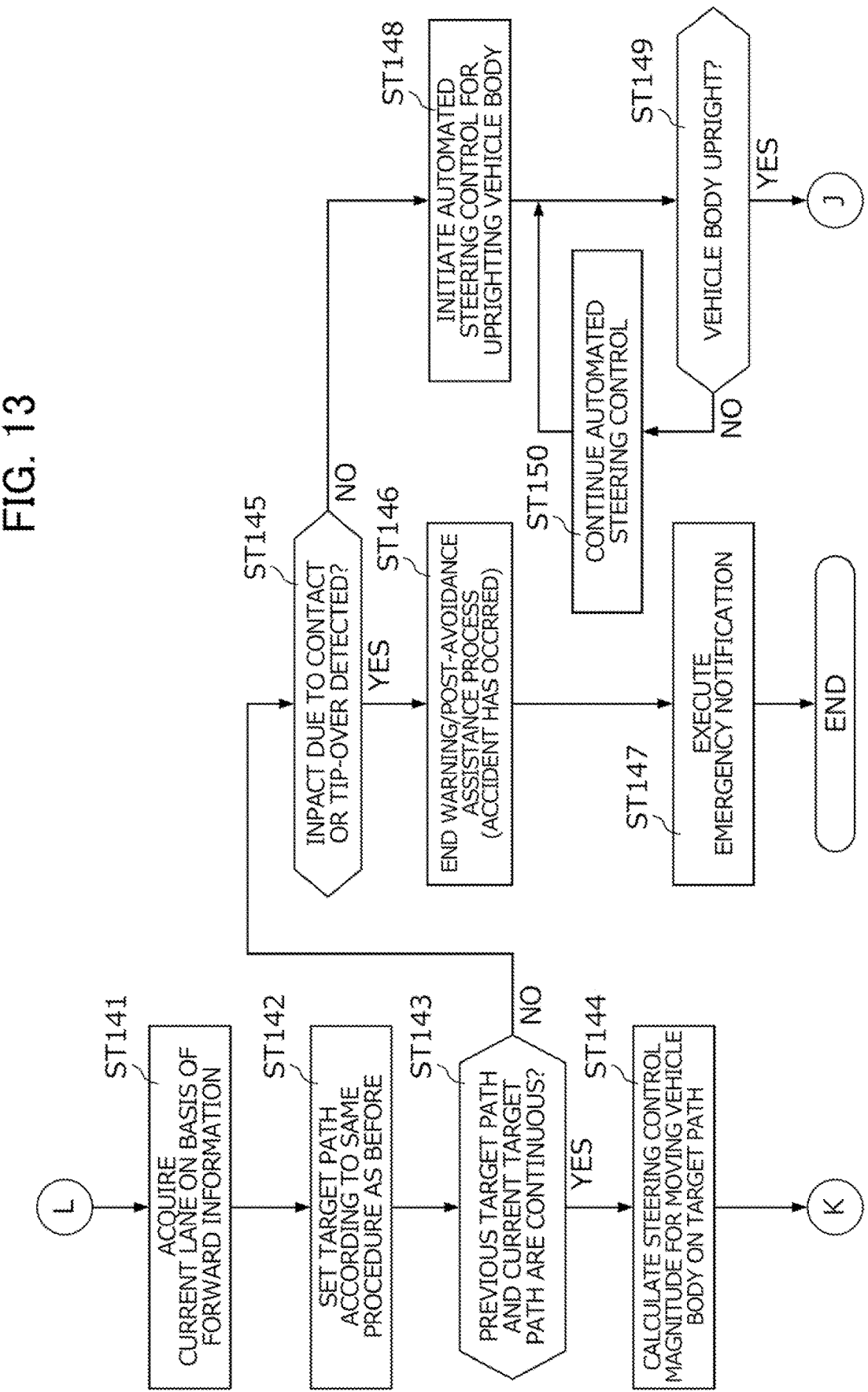
FIG. 13 is a flowchart illustrating a specific procedure of an emergency braking control by a driver assistance control device (post-avoidance assistance process)

In step ST137, the driver assistance control device 6 proceeds to a stopping assistance process for safely stopping the vehicle body, and proceeds to step ST141 (see FIG. 13).

As illustrated in FIG. 13, in step ST141, the driver assistance control device 6 acquires the current lane on the basis of the updated forward information acquired in step ST133, and proceeds to step ST142. In step ST142, the driver assistance control device 6 sets the target path according to the same procedure as before (step ST123 or step ST124), and proceeds to step ST143.

In step ST143, the driver assistance control device 6 determines whether or not previously set target path and the currently set target path are continuous. If the determination result in step ST143 is YES, the driver assistance control device 6 proceeds to step ST144, and if NO, the driver assistance control device 6 proceeds to step ST145. The case in which the previously set target path and the currently set target path are not continuous could be, for example, a failure of the external sensor unit 2 due to tipping over or a change in the environment ahead (such as patchiness in the lane markings).

In step ST144, the driver assistance control device 6 calculates the steering control magnitude for moving the vehicle body on the target path set in step ST142, and returns to step ST126 (see FIG. 11).

In step ST145, the driver assistance control device 6 determines, on the basis of the acceleration measured by the inertial measurement device 32, whether or not an impact due to contact between the vehicle body and the object or an impact due to the vehicle body tipping over is detected. If the determination result in step ST145 is YES, the driver assistance control device 6 proceeds to step ST146, and if NO, the driver assistance control device 6 proceeds to step ST148.

In step ST146, the driver assistance control device 6 determines that an accident has occurred, ends the warning and the post-avoidance assistance process in progress, and proceeds to step ST147. In step ST147, the driver assistance control device 6 uses the emergency notification device 5 to send an emergency notification to the emergency notification center, and then ends the emergency braking control.

In step ST148, the driver assistance control device 6 initiates the automated steering control for uprighting the vehicle body, and proceeds to step ST149. At this time, the driver assistance control device 6 may also upright the vehicle body through a combination of the automated steering control and the automated attitude control.

In step ST149, the driver assistance control device 6 determines whether or not the vehicle body is upright. If the determination result in step ST149 is NO, the driver assistance control device 6 proceeds to step ST150, and if YES, the driver assistance control device 6 proceeds to step ST161 (see FIG. 14). In step ST150, the driver assistance control device 6 continues to execute the automated steering control for uprighting the vehicle body, and returns to step ST149.

Figure 14:
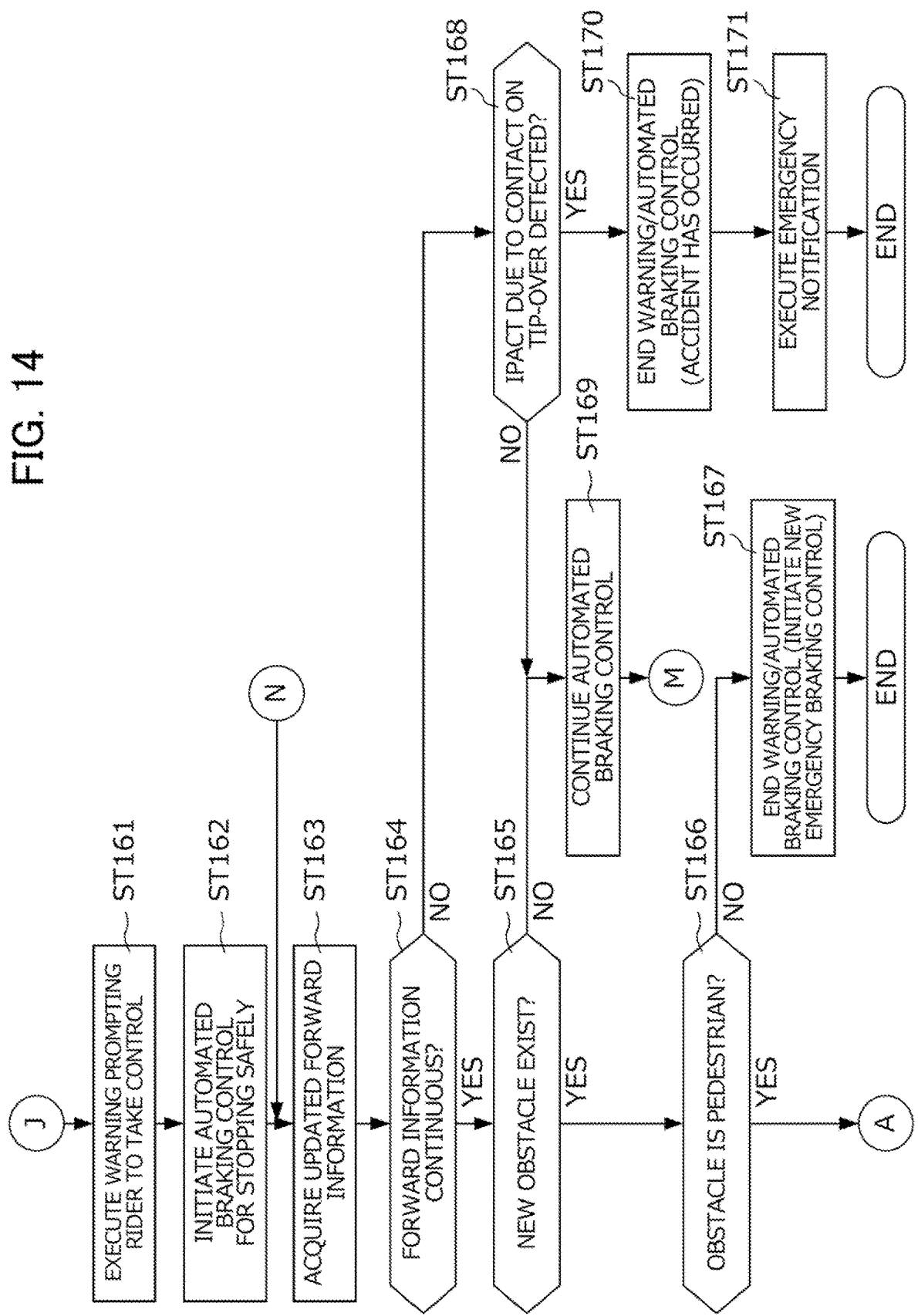
FIG. 14 is a flowchart illustrating a specific procedure of an emergency braking control by a driver assistance control device (post-avoidance assistance process)

As illustrated in FIG. 14, in step ST161, the driver assistance control device 6 executes a warning prompting the rider to take control, and proceeds to step ST162. The warning for prompting the rider to take control may be warning braking, for example. Since it is difficult for a motorcycle to maintain a stopped state, the driver assistance control device 6 executes the warning for prompting the rider to take control before initiating the automated braking control in the next step ST162.

In step ST162, the driver assistance control device 6 initiates the automated braking control for stopping the upright vehicle body automatically in a safe location, and proceeds to step ST163. In step ST163, the driver assistance control device 6 acquires updated forward information from the external sensor unit 2, and proceeds to step ST164.

In step ST164, the driver assistance control device 6 determines whether or not the forward information acquired in step ST163 is continuous from the previously acquired forward information. If the determination result in step ST164 is YES, the driver assistance control device 6 proceeds to step ST165, and if NO, the driver assistance control device 6 determines that the vehicle body has tipped over, and proceeds to step ST168.

In step ST165, the driver assistance control device 6 determines, on the basis of the updated forward information acquired in step ST163, whether or not an obstacle with a possibility of collision exists ahead of the vehicle body. If the determination result in step ST165 is YES, the driver assistance control device 6 proceeds to step ST166, and if NO, the driver assistance control device 6 proceeds to step ST168.

In step ST166, the driver assistance control device 6 determines whether or not the obstacle recognized in step ST165 is a pedestrian. If the determination result in step ST166 is YES, the driver assistance control device 6 returns to step ST1 (see FIG. 4) to resume the emergency braking control with respect to the new pedestrian as the object. Also, if the determination result in step ST166 is NO, the driver assistance control device 6 proceeds to step ST167. In step ST167, the driver assistance control device 6 ends the warning and the automated braking control in progress and then ends the emergency braking control to initiate the emergency braking control with respect to the new obstacle as the object.

In step ST168, the driver assistance control device 6 determines, on the basis of the acceleration measured by the inertial measurement device 32, whether or not an impact due to contact between the vehicle body and the object or an impact due to the vehicle body tipping over is detected. If the determination result in step ST168 is YES, the driver assistance control device 6 proceeds to step ST170, and if NO, the driver assistance control device 6 proceeds to step ST168. In step ST168, the driver assistance control device 6 continues the automated braking control initiated in step ST162, and proceeds to step ST181 (see FIG. 15).

In step ST170, the driver assistance control device 6 determines that an accident has occurred, ends the warning and the automated braking control in progress, and proceeds to step ST171. In step ST171, the driver assistance control device 6 uses the emergency notification device 5 to send an emergency notification to the emergency notification center, and then ends the emergency braking control.

Figure 15:
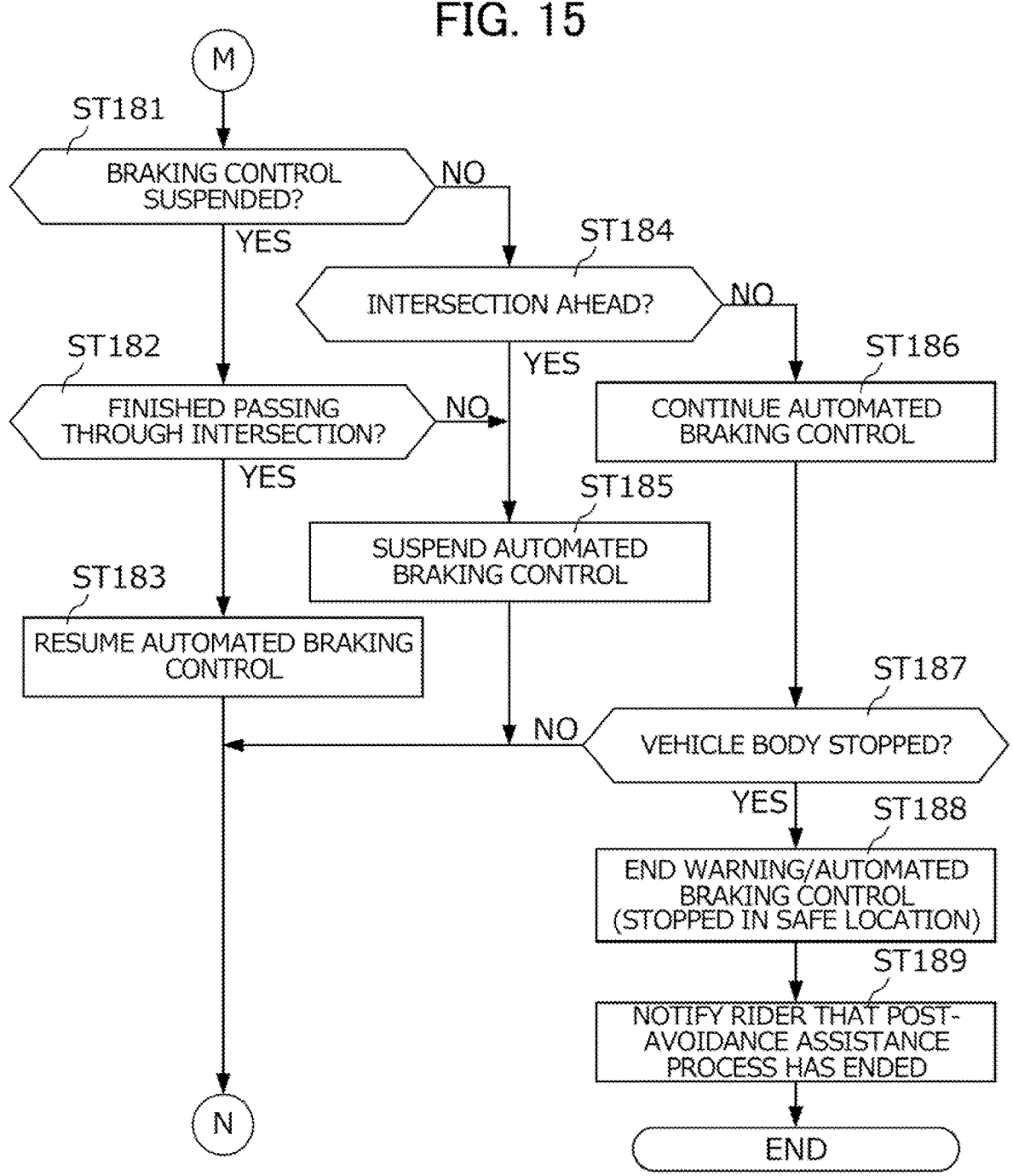
FIG. 15 is a flowchart illustrating a specific procedure of an emergency braking control by a driver assistance control device (post-avoidance assistance process)

As illustrated in FIG. 15, in step ST181, the driver assistance control device 6 determines whether or not the automated braking control is suspended from before. If the determination result in step ST181 is YES, the driver assistance control device 6 proceeds to step ST182, and if NO, the driver assistance control device 6 proceeds to step ST184.

In step ST182, the driver assistance control device 6 determines whether or not the vehicle passed through an intersection. If the determination result in step ST182 is YES, the driver assistance control device 6 proceeds to step ST183, and if NO, the driver assistance control device 6 proceeds to step ST185. In step ST183, the automated braking control that was suspended is resumed, and the flow proceeds to step ST163 (see FIG. 14). Also, in step ST185, the automated braking control in progress is suspended, and the flow proceeds to step ST163 (see FIG. 14).

In step ST184, the driver assistance control device 6 determines whether or not an intersection exists ahead. If the determination result in step ST184 is YES, the driver assistance control device 6 proceeds to step ST185, and if NO, the driver assistance control device 6 proceeds to step ST186. In step ST186, the driver assistance control device 6 continues the automated braking control in progress, and proceeds to step ST187.

In step ST187, the driver assistance control device 6 determines whether or not the vehicle body has stopped. If the determination result in step ST187 is NO, the driver assistance control device 6 returns to step ST163 (see FIG. 14), and if YES, the driver assistance control device 6 proceeds to step ST188. In step ST188, the driver assistance control device 6 determines that the vehicle body has moved to a safe location, ends the warning and the automated braking control in progress, and proceeds to step ST189. In step ST189, the driver assistance control device 6 notifies the rider that the post-avoidance assistance process has ended, and ends the emergency braking control.

As above, after avoiding contact with the object by executing the automated steering control for emergency avoidance, the driver assistance control device 6 executes the post-avoidance assistance process illustrated in FIGS. 10 to 15. Also, in the post-avoidance assistance process, the driver assistance control device 6 executes the automated steering control (see step ST148), the automated attitude control (see step ST148), and the automated braking control (see step ST162) in combination to decelerate the vehicle body in an upright state. This arrangement makes it possible to avoid both contact with the object and the tip over of the vehicle.

The driver assistance system 1 according to the present embodiment exhibits the following effects.

(1) In the driver assistance system 1, the driver assistance control device 6 executes the automated braking control that operates the brake device 83 automatically at a timing determined on the basis of the predicted time to collision calculated by the prediction controller 60. If the object is a pedestrian, the driver assistance control device 6 executes the braking control for emergency avoidance when the relative speed calculated by the prediction controller 60 is less than a speed threshold determined on the basis of the predicted time to collision, and executes the steering control for emergency avoidance that automatically changes the travel direction of the vehicle body when the relative speed is equal to or greater than the speed threshold. Thus, according to the driver assistance system 1, in the case in which the relative speed is less than the speed threshold and contact with the object is avoidable through the braking control for emergency avoidance, the braking control for emergency avoidance with a low vehicle tip-over risk can be executed to avoid contact between the vehicle and the object while also preventing damage due to tip over of the vehicle. Also, in the case in which the relative speed is equal to or greater than the speed threshold and contact with the object is unavoidable through the braking control for emergency avoidance, the steering control for emergency avoidance can be executed to avoid contact between the vehicle and the object. Thus, according to the driver assistance system 1, by switching between the braking control for emergency avoidance and the steering control for emergency avoidance depending on the relative speed and predicted time to collision with respect to the object, contact between the vehicle and the object which is a pedestrian can be avoided as much as possible, thereby improving traffic safety.

(2) By setting the speed threshold to a smaller value as the predicted time to collision is shorter, the driver assistance control device 6 can appropriately separate cases in which contact is avoidable through the braking control for emergency avoidance from cases in which contact is avoidable through the steering control for emergency avoidance, and thus contact between the vehicle and the object which is a pedestrian can be avoided as much as possible.

(3) If the relative speed is equal to or greater than the speed threshold and an avoidance space at least free of an obstacle exists in the vicinity of the object, the driver assistance control device 6 changes the travel direction of the vehicle body to the avoidance space by executing the steering control for emergency avoidance, and if the relative speed is equal to or greater than the speed threshold and an avoidance space does not exist, the driver assistance control device 6 executes the braking control for emergency avoidance. This arrangement makes it possible to prevent the vehicle body from making contact with an obstacle after the travel direction of the vehicle body is changed to avoid contact with the object, thereby improving traffic safety.

(4) The driver assistance control device 6 determines whether or not an avoidance space exists within the lane in which the vehicle is traveling or on the road other than the sidewalk. This arrangement makes it possible to prevent the vehicle body from making contact with another moving body traveling in a travel lane adjacent to the vehicle body or from driving up onto a sidewalk after the travel direction of the vehicle body is changed to avoid contact with the object, thereby improving traffic safety.

(5) If the object is a crossing pedestrian who is crossing the road, the driver assistance control device 6 determines whether or not an avoidance space exists with priority given to the rearward side of the movement direction of the object over the forward side of the movement direction of the object. With this arrangement, contact between the vehicle and the object can be avoided more reliably, thereby improving traffic safety.

(6) The prediction controller 60 calculates the relative speed and the predicted time to collision after the startup time of the automated braking control from the point in time when the predicted time to collision is determined to be less than or equal to the collision possibility determination time threshold (that is, the collision possibility determination line L3) as the relative speed estimate and the predicted time to collision estimate, respectively, and the driver assistance control device 6 executes the braking control for emergency avoidance when the relative speed estimate is less than the speed threshold determined on the basis of the predicted time to collision estimate, and executes the steering control for emergency avoidance when the relative speed estimate is equal to or greater than the speed threshold. Thus, according to the driver assistance system 1, at the point in time when the predicted time to collision has become less than or equal to the collision possibility determination time threshold, the determination of whether the braking control for emergency avoidance or the steering control for emergency avoidance should be executed can be made appropriately with consideration for the time required to start up the braking control for emergency avoidance, thereby avoiding contact between the vehicle and the object as much as possible, and by extension, improving traffic safety further.

(7) The driver assistance control device 6 executes warning braking that vibrates the vehicle body, and by extension the part of the rider's body touching the vehicle body, by automatically operating the brake device to generate braking force intermittently when the predicted time to collision is less than or equal to the warning braking determination time threshold (that is, the warning braking determination line L2) set to a larger value than the collision possibility determination time threshold, or in other words, before the braking control for emergency avoidance or the steering control for emergency avoidance is executed, and thus the rider can reliably be made aware of the existence of the object before the braking control for emergency avoidance or the steering control for emergency avoidance is initiated, thereby avoiding contact between the vehicle and the object as much as possible, and by extension, improving traffic safety further.

(8) The driver assistance control device 6, after avoiding contact with the object by executing the steering control for emergency avoidance, executes a post-avoidance assistance process that decelerates the vehicle body in an upright state by operating the brake device and the steering device automatically. This arrangement makes it possible to avoid both contact between the vehicle and the object and the tip over of the vehicle, thereby improving traffic safety further.

The foregoing describes an embodiment of the present invention, but the present invention is not limited thereto. The particulars of the configuration may be modified as appropriate within the scope of the present invention.

What is claimed is:

1. A driver assistance system installed in a motorcycle comprising:
    a forward information acquirer configured to acquire forward information about a state ahead of a motorcycle body;
    a predictor configured to calculate, on a basis of the forward information, a relative speed and a predicted time to collision between the motorcycle body and an object ahead of the motorcycle body; and
    a driver assistance controller configured to execute selectively either an automated braking control that operates a brake device automatically at a timing determined on a basis of the predicted time to collision and a travel direction change control that automatically changes a travel direction of the motorcycle body, wherein
    if the object is a pedestrian, the driver assistance controller
    executes the automated braking control when the relative speed is less than a speed threshold determined on a basis of the predicted time to collision, and
    executes the travel direction change control when the relative speed is equal to or greater than the speed threshold, and after avoiding contact with the object by executing the travel direction change control, executes a post-avoidance assistance process that decelerates the motorcycle body in an upright state by operating the brake device and a steering device automatically.

2. The driver assistance system according to claim 1, wherein the driver assistance controller sets the speed threshold to a smaller value as the predicted time to collision is shorter.

3. The driver assistance system according to claim 1, wherein if the relative speed is equal to or greater than the speed threshold and an avoidance space at least free of an obstacle exists in a vicinity of the object, the driver assistance controller executes the travel direction change control and changes the travel direction of the motorcycle body to the avoidance space, and if the relative speed is equal to or greater than the speed threshold and the avoidance space does not exist, the driver assistance controller executes the automated braking control.

4. The driver assistance system according to claim 3, wherein the driver assistance controller determines whether or not the avoidance space exists within a lane in which the motorcycle is traveling or on a road other than a sidewalk.

5. The driver assistance system according to claim 3, wherein if the object is a crossing pedestrian who is crossing a road, the driver assistance controller determines whether or not the avoidance space exists with priority given to a rearward side of a movement direction of the object over a forward side of the movement direction of the object.

6. The driver assistance system according to claim 1, wherein
    the predictor calculates the relative speed and the predicted time to collision after a startup time of the automated braking control from a point in time when the predicted time to collision is determined to be less than or equal to a predetermined first time threshold as a relative speed estimate and a predicted time to collision estimate, respectively, and
    the driver assistance controller executes the automated braking control when the relative speed estimate is less than the speed threshold determined on a basis of the predicted time to collision estimate, and executes the travel direction change control when the relative speed estimate is equal to or greater than the speed threshold.

7. The driver assistance system according to claim 6, wherein if the predicted time to collision is less than or equal to a second time threshold set to a larger value than the first time threshold, the driver assistance controller executes warning braking that vibrates the motorcycle body by automatically operating the brake device to generate braking force intermittently.

8. A driver assistance system installed in a motorcycle comprising:
   a forward information acquirer configured to acquire forward information about a state ahead of a motorcycle body;
   a predictor configured to calculate, on a basis of the forward information, a relative speed and a predicted time to collision between the motorcycle body and an object ahead of the motorcycle body; and
   a driver assistance controller configured to execute selectively either an automated braking control that operates a brake device automatically at a timing determined on a basis of the predicted time to collision and a travel direction change control that automatically changes a travel direction of the motorcycle body, wherein
   if the object is a pedestrian, the driver assistance controller
   executes the automated braking control when the predicted time to collision is greater than a time threshold determined on a basis of the relative speed, and
   executes the travel direction change control when the predicted time to collision is less than or equal to the predicted time to collision, and after avoiding contact with the object by executing the travel direction change control, executes a post-avoidance assistance process that decelerates the motorcycle body in an upright state by operating the brake device and a steering device automatically.

9. The driver assistance system according to claim 8, wherein the driver assistance controller sets the time threshold to a smaller value as the relative speed is lower.

* * * * *